(12) United States Patent
Peiker

(10) Patent No.: US 7,248,901 B2
(45) Date of Patent: Jul. 24, 2007

(54) ARRANGEMENT FOR HANDLING A COMMUNICATION DEVICE

(76) Inventor: Andreas Peiker, Max-Planck-Strasse 32, 61381, Friedrichsdorf (DE)

( * ) Notice: Subject to any disclaimer, the term of this patent is extended or adjusted under 35 U.S.C. 154(b) by 408 days.

(21) Appl. No.: 10/466,481

(22) PCT Filed: Jan. 16, 2002

(86) PCT No.: PCT/DE02/00115

§ 371 (c)(1), (2), (4) Date: Jul. 17, 2003

(87) PCT Pub. No.: WO02/057117

PCT Pub. Date: Jul. 25, 2002

(65) Prior Publication Data

US 2004/0087335 A1    May 6, 2004

(30) Foreign Application Priority Data

| Jan. 18, 2001 | (DE) | ............................ 101 02 277 |
| Apr. 20, 2001 | (DE) | ............................ 101 19 655 |
| Jun. 12, 2001 | (DE) | ........................ 201 13 300 U |
| Oct. 5, 2001 | (DE) | ............................ 101 49 249 |
| Oct. 9, 2001 | (DE) | ............................ 101 49 641 |

(51) Int. Cl.
*H04M 1/00* (2006.01)
(52) U.S. Cl. ..................... 455/569.1; 455/569.2
(58) Field of Classification Search ........... 455/557, 455/463, 466, 404.1, 90, 575, 550, 569, 569.2, 455/563, 569.1, 556.1, 575.1, 575.9
See application file for complete search history.

(56) References Cited

U.S. PATENT DOCUMENTS

| 4,972,470 A | 11/1990 | Farago |
| 5,095,541 A | 3/1992 | Aisaka et al. |
| 5,353,334 A | 10/1994 | O'Sullivan |
| 5,479,479 A * | 12/1995 | Braitberg et al. ........ 455/404.1 |
| 5,493,703 A | 2/1996 | Yamashita |
| 5,535,274 A * | 7/1996 | Braitberg et al. ........... 379/446 |
| 5,774,793 A * | 6/1998 | Cooper et al. ............. 455/418 |

(Continued)

FOREIGN PATENT DOCUMENTS

DE    42 92 401    7/1992

(Continued)

OTHER PUBLICATIONS

Bury-Zeichnung UNI-Sub D Halterplatine für Nokia (Artikel Nr. 08.10.0105.0) vom Jul. 27, 2000.

(Continued)

*Primary Examiner*—Edward F. Urban
*Assistant Examiner*—Tu X. Nguyen
(74) *Attorney, Agent, or Firm*—Burr & Brown

(57) ABSTRACT

An arrangement (1) is proposed for handling a communication device (2), which arrangement (1) comprises an attachment device (4) which can be used universally and is not specific to any given mobile telephone, and a device holder (3) which is specific to a mobile telephone, and which together form the complete arrangement (1) in the assembled state. In this case, the device holder (3) contains the necessary mechanical and electrical and/or electronic matching means to the respective communication device (2) that is to be used.

69 Claims, 26 Drawing Sheets

U.S. PATENT DOCUMENTS

| | | | |
|---|---|---|---|
| 5,822,427 A | | 10/1998 | Braitberg et al. |
| 6,341,218 B1 | * | 1/2002 | Poplawsky et al. ...... 455/569.1 |
| 6,377,825 B1 | * | 4/2002 | Kennedy et al. ......... 455/569.2 |
| 6,697,638 B1 | * | 2/2004 | Larsson et al. .......... 455/553.1 |

FOREIGN PATENT DOCUMENTS

| | | |
|---|---|---|
| DE | 41 07 995 A1 | 9/1992 |
| DE | 43 00 848 | 8/1993 |
| DE | 295 12 368 U1 | 11/1995 |
| DE | 295 20 231 U1 | 3/1996 |
| DE | 296 14 668 | 1/1997 |
| DE | 296 16 889 | 3/1997 |
| DE | 297 04 395 | 6/1997 |
| DE | 196 52 826 A1 | 6/1998 |
| DE | 196 31 444 | 8/1998 |
| DE | 196 31 444 A1 | 8/1998 |
| DE | 197 04 992 A1 | 8/1998 |
| DE | 197 15 596 | 10/1998 |
| DE | 197 15 596 A1 | 10/1998 |
| DE | 197 17 237 | 10/1998 |
| DE | 198 50 044 | 10/1998 |
| DE | 299 03 958 U1 | 7/1999 |
| DE | 299 07 072 | 8/1999 |
| DE | 299 07 072 U1 | 8/1999 |
| DE | 299 10 287 | 9/1999 |
| DE | 198 35 017 | 2/2000 |
| DE | 198 35 017 A1 | 2/2000 |
| DE | 198 35 017 C2 | 2/2000 |
| DE | 299 19 581 U1 | 2/2000 |
| DE | 198 39 685 | 3/2000 |
| DE | 198 50 044 C1 | 3/2000 |
| DE | 299 21 313 U1 | 3/2000 |
| DE | 299 18 830 | 4/2000 |
| DE | 200 15 036 | 11/2000 |
| DE | 200 11 311 U1 | 12/2000 |
| DE | 200 15 036 | 1/2001 |
| DE | 19921533 | 1/2001 |
| DE | 299 12 359 | 2/2001 |
| DE | 29922381 | 3/2001 |
| DE | 199 46 746 A1 | 4/2001 |
| DE | 199 47 064 A1 | 4/2001 |
| EP | 0 309 627 | 4/1989 |
| EP | 0 449 471 | 10/1991 |
| EP | 0 494 780 | 7/1992 |
| EP | 0 559 187 | 9/1993 |
| EP | 0 641 088 | 3/1995 |
| EP | 0 760 188 | 3/1997 |
| EP | 0 831 667 | 3/1998 |
| EP | 0 833 762 B1 | 8/1998 |
| EP | 0 932 142 | 7/1999 |
| EP | 1 266 456 | 12/2002 |
| JP | 4-331544 | 11/1992 |
| JP | 7-315138 | 12/1995 |
| JP | 08-321865 | 12/1996 |
| WO | 94/09586 | 4/1994 |
| WO | 94/24775 | 10/1994 |
| WO | WO 95/28789 A1 | 10/1995 |
| WO | WO 97/00792 A1 | 1/1997 |
| WO | 97/33384 | 9/1997 |
| WO | WO 98/11747 A1 | 3/1998 |
| WO | 98/42537 | 10/1998 |
| WO | 98/59425 | 12/1998 |
| WO | WO 98 57824 | 12/1998 |
| WO | 01/41484 | 6/2001 |
| WO | WO 01/41484 A1 | 6/2001 |
| WO | 01/61875 | 8/2001 |
| WO | WO 01/61875 A1 | 8/2001 |

OTHER PUBLICATIONS

Bury-Zeichnung UNI-Stecker für Siemens X25 & C28 (Artikel Nr. 08.10.0111.0) vom Jul. 7, 2000.

THB Bury Germany Mobilfunk Equipment, No. 72100619, Dec. 1, 2001.

DPD, 209980, Jan. 16, 2001.

THB Bury Germany Mobilfunk Equipment No. 62100143, Mar. 1, 2001.

* cited by examiner

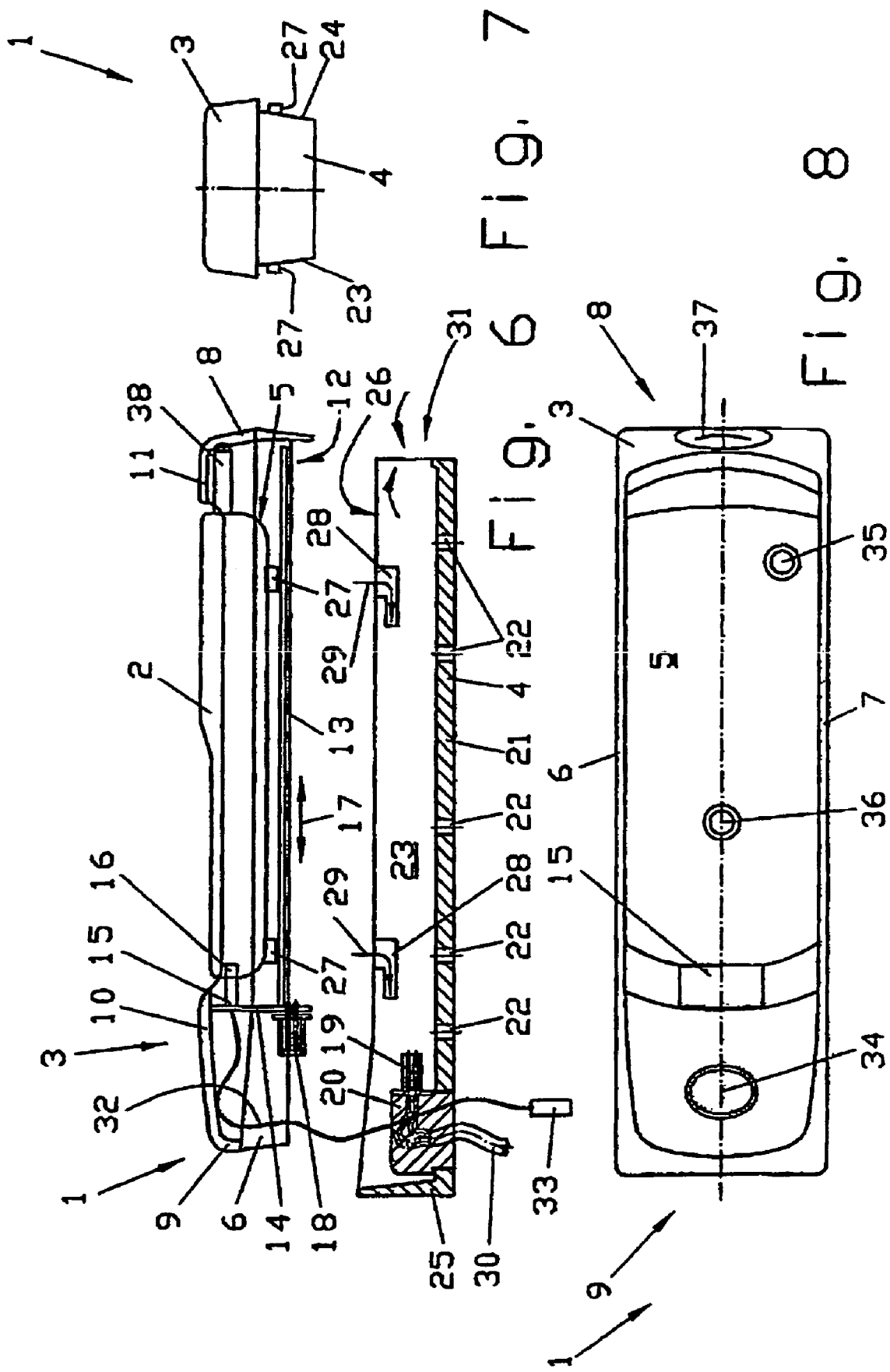

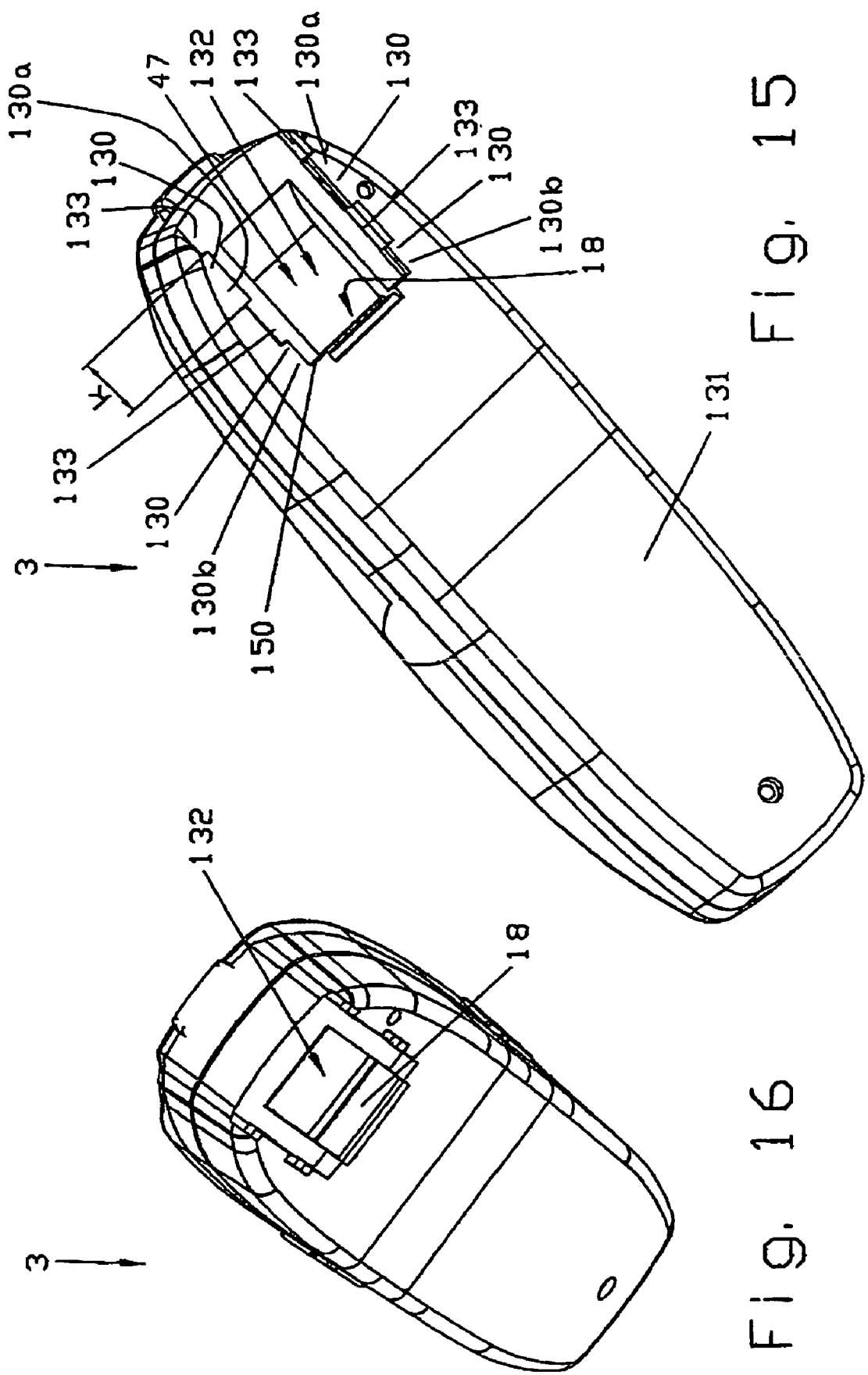

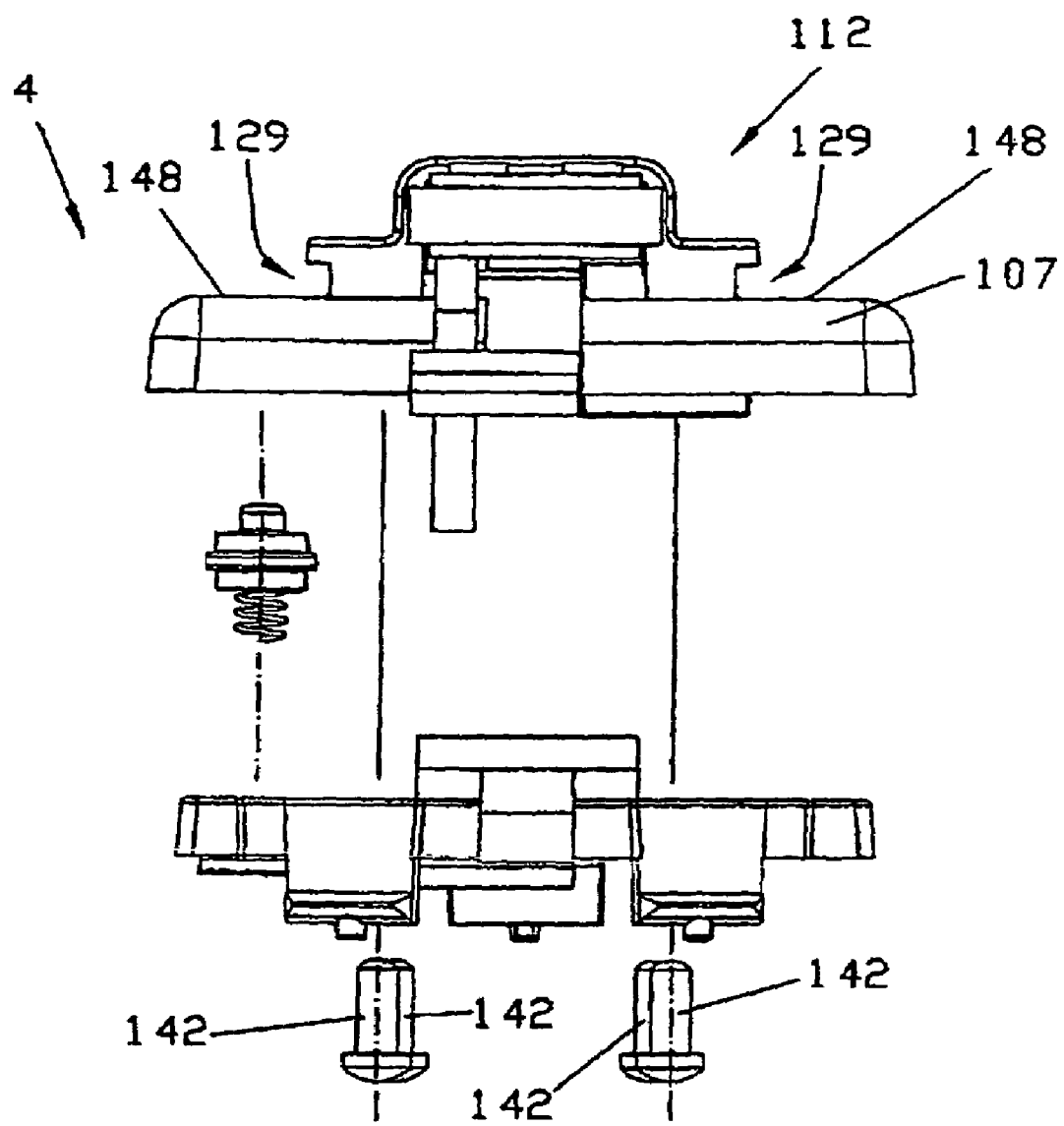
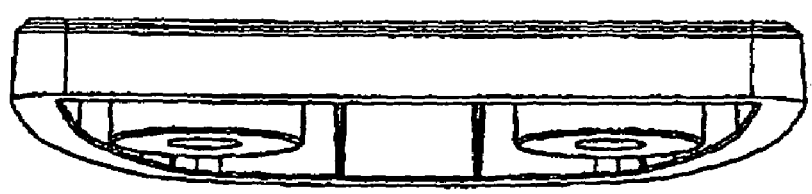
Fig. 18

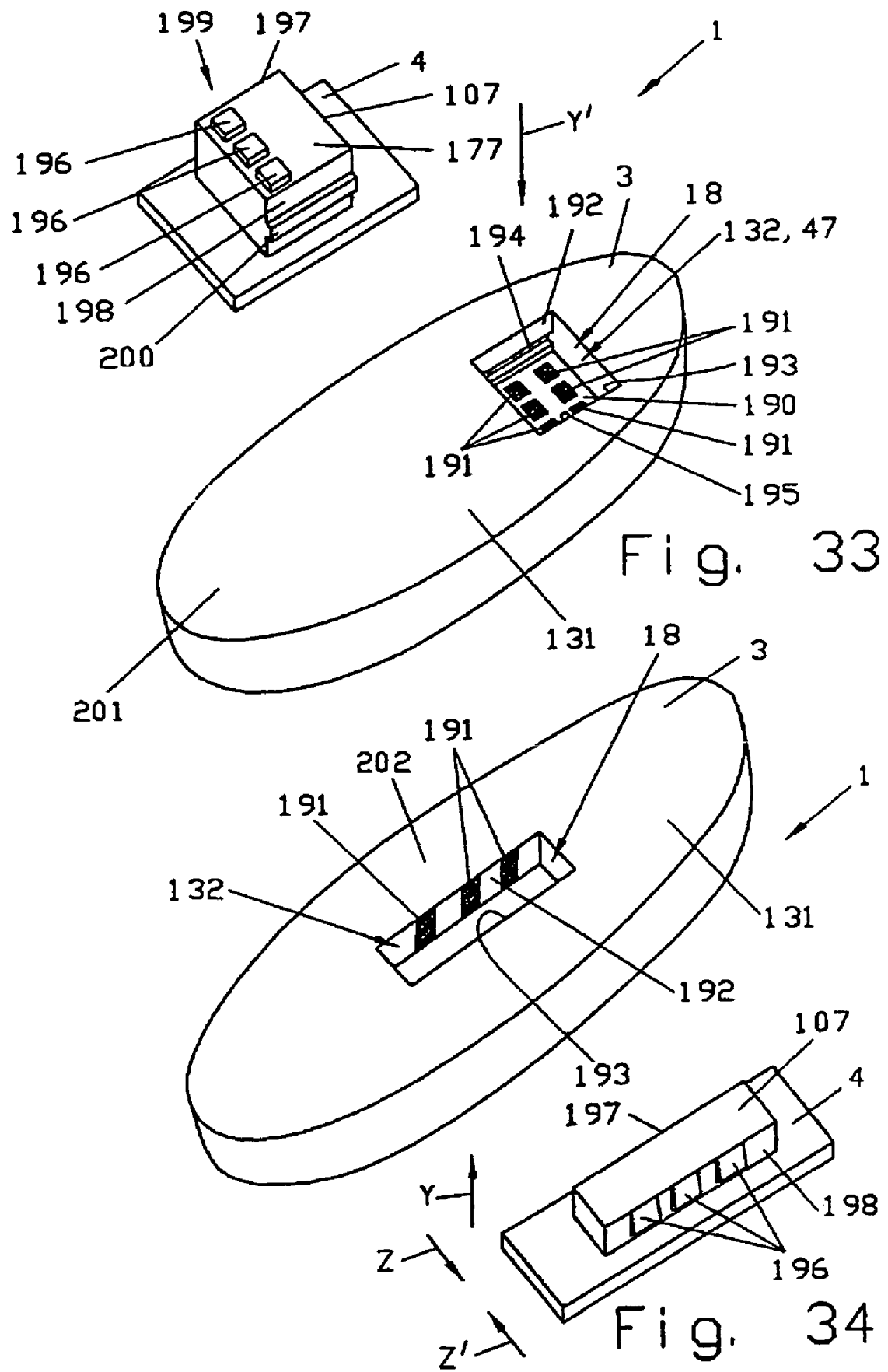

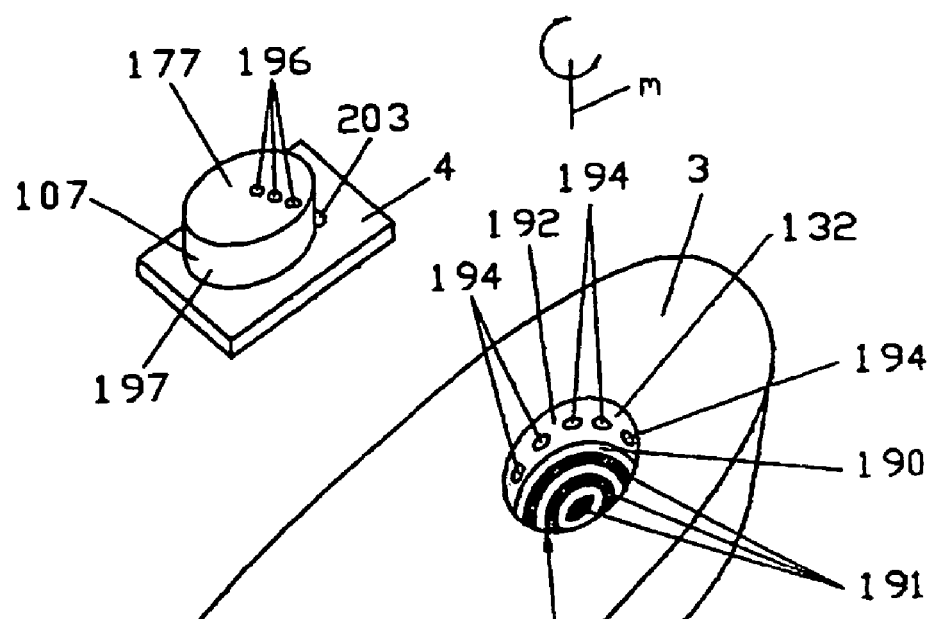
Fig. 35
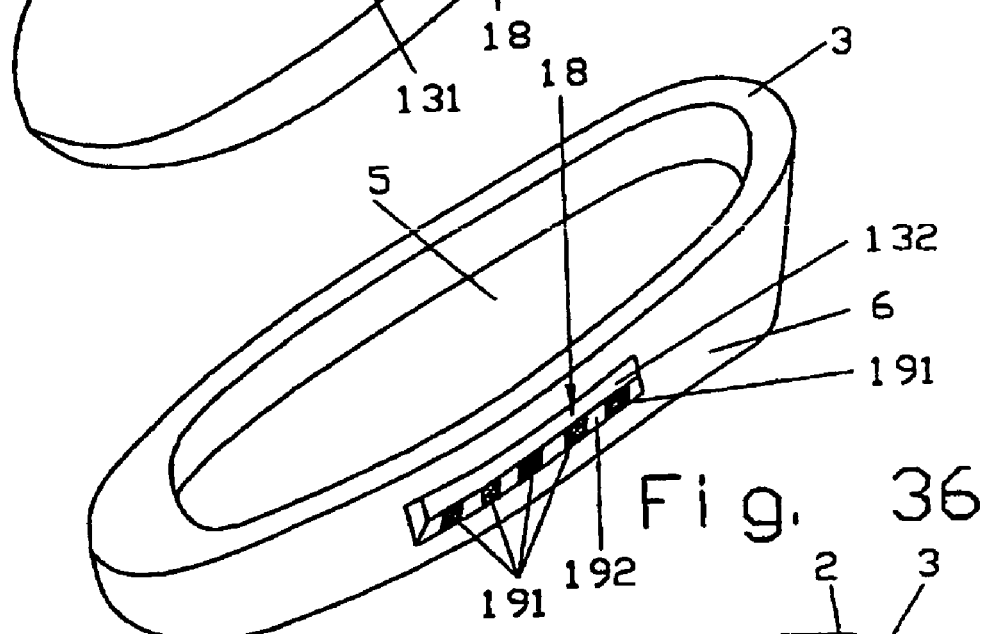
Fig. 36
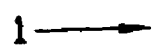
Fig. 37

ARRANGEMENT FOR HANDLING A COMMUNICATION DEVICE

The invention relates to an arrangement for handling a communication device as claimed in the precharacterizing clause of claim 1 and 15.

PRIOR ART

When using telephones in motor vehicles, a distinction is drawn between fixed installations, in which all the telephone components are mounted permanently in the motor vehicle, and between the use of portable mobile telephones (cellular telephones), which are likewise used as a motor vehicle telephone in the motor vehicle. A large number of holders, which are more or less complex, are known for integration of a mobile telephone in a motor vehicle. In particular, combined holders have become known, into which a mobile telephone can be inserted. Holders may connect the mobile telephone to a hands-free device which is arranged in the motor vehicle, to a power supply, to an antenna connection or to other components or functional elements. This connection is made via a cable which leads into the motor vehicle from the holder, for example on the dashboard. The holder together with the mobile telephone may optionally be removed from a rest for the holder and be used effectively as a telephone handset (EP 0 833 762). Normally, however, the mobile telephone remains in the holder in the motor vehicle and is effectively used as a stationary device, by means of a hands-free device, while traveling.

In a large number of known devices, the geometry of the holder for the mobile telephone is essentially matched to the shape of the mobile telephone, with an interface being provided in the form of a plug connection, for electrical connection of the holding shell to the mobile telephone. The holding shell itself is generally detachably connected to the motor vehicle via a holder or baseplate which is mounted in the motor vehicle.

The holder or baseplate for the holder shell generally has only one switch element or position recognition element, in order to detect the orientation and position of the holding shell for the mobile telephone on this holder. The hands-free device is activated or switched off as a function of this.

Holders have also become known for mobile telephones for use in a motor vehicle, in which the holders have electronic components and, in particular, electronic circuits for various purposes, such as emergency call functions, etc. (WO 98/11747). This holder is connected to the motor vehicle via a rest plate which is mounted in the motor vehicle.

All such known devices are commercially available as complete devices and need to be installed in the respective motor vehicle with a greater or lesser amount of physical effort. Generally, the mobile telephone cannot be replaced without replacing virtually the entire motor vehicle telephone system.

FIG. 10 in JP 4331544 discloses a holder for a telephone, into which this telephone can be inserted together with an adapter, with the holder engaging around the adapter and the mobile telephone.

FIG. 14, for example, in U.S. Pat. No. 5,479,479 discloses an apparatus for integration of a mobile telephone in a vehicle, which apparatus is connected via a cable to the mobile telephone and has a microprocessor for control purposes. This apparatus is, for example, equipped with a charger, a power supply, an identification module, a memory and an amplifier, and has connections to which individual components that are arranged in the vehicle, such as a loudspeaker, a microphone, a power supply and an antenna, can be connected.

U.S. Pat. No. 5,535,274 discloses a holding apparatus for a mobile telephone, which comprises a shell (pocket) that is matched to the mobile telephone and a base station (interface unit), which is provided for a large number of different mobile telephones and has electronics for, for example, hands-free purposes, a charger and noise suppression. In this case, information about the type of mobile telephones for which the shell is intended is stored in the shell, via pin-coding of the connecting plug. The base station uses this information to match the electronics to the requirements of the mobile telephone. Upward compatibility of this system is achieved only providing that the requirements which future mobile telephones will place on a base station have already been taken into account in the base station.

JP 7315138 A discloses a holder for a mobile telephone which comprises a box-like receptacle for the mobile telephone and an L-shaped holder for the receptacle. The box-like receptacle has two interfaces. The first interface is used to make contact with the mobile telephone, and the second interface is used to make contact with the holder. The receptacle is held detachably with an interlock via guides which are similar to dovetails.

DE 299 21 313 U1 discloses a mobile telephone holder for a vehicle, in which an accommodation shell for the mobile telephone can be latched onto a baseplate which is firmly connected to the vehicle. The electrical link between the mobile telephone and the hands-free device and components which are arranged in the vehicle is made via a cable which is connected to an interface arranged in the holding shell.

An apparatus with an adapter for hands-free operation of a mobile telephone has been proposed in the prior application WO 01/41484. This comprises a holding shell (pocket member) with an accommodation section (receiving section) and an attachment section (mounting section), with the accommodation section being adapted to hold a mobile telephone, and with the holding shell also having a locking mechanism (latching mechanism) in order to hold the mobile telephone in the accommodation section, and having a connecting piece for making contact with the electronics in the mobile telephone. The apparatus furthermore comprises an interface module, which has a further accommodation section (receiving section) and, for this purpose, is matched to the fastening section of the holding shell. In simple terms, this apparatus comprises two shells which are matched to one another, can be plugged together and, when plugged together, are mechanically and electrically connected to one another. The larger shell is formed by the interface module and holds the holding shell, which is in the form of the smaller shell, in a similar way to a box, and encloses it. This holding of and making contact with an accommodation shell for a mobile telephone on an interface module has already been disclosed in FIGS. 22 and 23 of U.S. Pat. No. 5,535,274 and JP 73152138. An apparatus such as this has the disadvantage that the interface module, which is mounted permanently in the vehicle separately from the mobile telephone and the holding shell when the apparatus is not being used, occupies a large amount of physical space without any change even in this situation, and, as an obstruction, restricts the free space for the occupants of the vehicle. Not least, a component such as this which enters the space represents an accident risk in the form of objects becoming stuck or, in the extreme case, even injuring an occupant. An interface module such as this is particularly disturbing when, as proposed, it is installed in a vehicle in the factory and is not used by the occupants.

Electronics for an apparatus as described in WO 01/41484 have been proposed in the prior application WO 01/61875 A1. The holding shell in this case holds electronics which are matched to the mobile telephone and interact with electronics that are arranged in the interface module. In this case, the electronics that are arranged in the holding shell carry out the function of an adapter between a mobile telephone that is held in the holding shell and the electronics which are arranged in the interface module. The electronics which are provided in the interface module are designed analogously to the electronics described for the base station in U.S. Pat. No. 5,535,274, and, are suitable for a large number of mobile telephones. To this extent, the upward compatibility problem also arises in this case since, when a change is made to a more modern mobile telephone, only the supposedly low-cost replacement of the holding shell is envisaged. However, the replacement of only one component is not sufficient for a relatively large number of development steps in mobile radio technology, since the mobile telephone and/or the holding shell will then normally have characteristics which the interface module cannot satisfy. This is because it was designed at a time at which, for example, specific Standards or transmission techniques had not yet been developed or were not yet available.

An arrangement as claimed in the precharacterizing clause of claims 1 and 15 has been disclosed in DE 200 15 036 U. Modern motor vehicles normally have a circular holder, possibly in the form of a pot, for drinks cans. A drinks can holder device such as this in a motor vehicle is, according to this document, used to install a transportable hands-free facility for a mobile telephone in the motor vehicle. In this case, the mobile telephone is inserted into a mechanically and electrically matched holder, which includes all the devices for a hands-free facility in the motor vehicle. In particular, an electrical or electronic interface is also provided between the mobile telephone and the holder. However, the holder itself is only mechanically inserted into the drinks can holder device.

Object, Solution and Advantages of the Invention:

The object of the invention is to propose an arrangement for integration of a communication device, which arrangement is completely upward-compatible by virtue of the replacement of a single component which can be used in the vehicle without any installation effort, and which allows the upgrading of a vehicle with apparatuses of different performance, occupies as little space as possible if not used, and then does not result in any risks of injury or accident either.

This object is achieved in conjunction with the features of the respective precharacterizing clause by the characterizing features of claim 1 and of claim 15. Advantageous and expedient developments of the holder are specified in the dependent claims.

The invention is based on the fundamental idea that a multipart arrangement is proposed, in which a universal attachment device, which is in the form of a basic device and is suitable for all types of mobile telephones and communication devices, is provided in a preferred manner to the manufacturers of motor vehicles. This standardized attachment device, which can be used universally in motor vehicles, is then used to hold an accommodation housing which is individually matched to a respective mobile telephone or communication device and, as a special housing together with the attachment device, forms a complete holder. In this case, the attachment device which is permanently installed in the motor vehicle comprises only a minimum of electrical components, such as a universal electrical interface for electrical connection to the accommodation housing, which is designed to be variable, for the mobile telephone. The electrical components are, for example, in the form of plug elements, comprising cables and contact elements. This is consistent with the aim of the device holder, which holds the mobile telephone, not needing to be provided just with components which are necessary by virtue of the specific mobile telephone, but also being fitted with components which are not specific to one mobile telephone. The device holder holds an electronic circuit which comprises at least all the electronic components which are required for operation and control of a convenience device, for example a hands-free device. The device holder is connected to the attachment device via universal, mechanical and electrical standardization and matching. The attachment device is in turn connected only to electrical and electronic components for inputting and/or outputting speech and/or data. With an arrangement such as this, it is possible without any problem to integrate a new communication device in a vehicle, since only a matching device holder is required for this new communication device. This matching device holder contains electronics which are matched to the functional scope and performance of the mobile telephone, such as a hands-free device with speech recognition. The contact between the device holder and the electrical and electronic components which are arranged in the vehicle, such as a microphone and loudspeaker, is made via the standardized attachment device. The scope and number of the convenience facilities in this case depends on the performance of the device holder and of the communication device. To this extent, the customer has the capability to select between device holders of different performance. For example, it is possible to select between a device holder with speech recognition and a device holder without speech recognition.

One specific arrangement for handling a communication device such as a mobile telephone, personal digital assistant (PDA) or the like for use in a vehicle or the like comprises a device holder, which holds the communication device, and an attachment device which is mechanically matched to the device holder. In this case, the device holder is in the form of a device-specific component with geometric and/or mechanical matching to the specific characteristics of the communication device, and an electronic circuit is provided within the device holder, with the electronic circuit comprising all the electronic components which are required for connection of at least one antenna, a loudspeaker, a microphone and a power supply, with universal, mechanical and/or universal electrical standardization and/or matching being provided for connection of the device holder to the attachment device.

A further specific holder or arrangement for a mobile telephone, in particular for use in a motor vehicle, comprises an accommodation housing, which holds the mobile telephone, and an attachment device for the accommodation housing in the motor vehicle, with geometric, mechanical and electrical and/or electronic matching to the specific characteristics of the mobile telephone being provided in the accommodation housing, and with specific matching for the mobile telephone to the functional facilities contained in the motor vehicle, such as a microphone, a loudspeaker, a power supply etc, being provided by means of an electronic circuit in the accommodation housing. In this case, an electrical and/or electronic interface is provided between the accommodation housing and an attachment device, which can be used universally in the motor vehicle, for the accommodation housing.

The mobile-telephone-specific accommodation housing, the device holder, comprises geometric, mechanical and electrical/electronic matching to the respective mobile telephone to be used, in particular with an electronic circuit being provided on a board, which provides comprehensive matching of the respective mobile telephone to the functional facilities contained in the vehicle, such as a microphone, loudspeaker, power supply and antenna. Other facilities, such as speech recognition, emergency call characteristics, etc. are preferably accommodated in the device holder. An attachment device of particularly simple construction in a motor vehicle and which can be used universally and interacts with the device holder which is matched to the mobile telephone provides an overall holder, which can be produced extremely cost-effectively since the electronics need be installed in only one component of the overall holder. In this case, the overall holder is formed only when these components, which can initially be handled separately, are joined together, that is to say a motor vehicle manufacturer may, for example, equip all the motor vehicles with a corresponding attachment device as a type of baseplate or basic housing. The corresponding upper part is then supplied depending on the customer's requirements and matching to the respective mobile telephone, and is fitted retrospectively, with the holder being formed only by the interaction of the attachment device, which is arranged in the vehicle and can be used universally, with the device holder for use of the respective mobile telephone. In this case, the attachment device which is mounted in the vehicle should, in particular, also be a part of the overall housing, which is formed by joining together effectively an upper part, the device holder, and a lower part, the attachment device. In this case, the device holder is designed as an autonomous, complete housing which, when coupled to the attachment device, forms a visually attractive unit whose dimensions essentially match those of the device holder. The concentration of the electronic components in the device holder and their specific matching to the communication device to be integrated mean that the attachment device is a universal component which can be used independently of the communication device to be integrated. Thus, even when using different types of communication device or when using a new communication device, there is no need to replace or to adapt the attachment device. To this extent, it is possible to integrate the attachment device optimally, in particular visually, in a vehicle, since there is no need to take into account any need to replace the attachment device. As a result of the standardization between the attachment plate and the device holder, with respect to the mechanical content and/or with the capability to make electrical contact with the device holder, this provides the user with the capability to use his communication means in all vehicles which have a standardized, low-cost and small attachment device, of simple construction.

The connection of the mobile telephone to the device holder via a radio link means that it is possible to reduce the plugging-in process, which requires care, for making contact between the mobile telephone and the device holder to a plugging-in process which requires considerably less care, or to dispense with the plugging-in process entirely. A plugging-in process which requires less care is provided when, in addition to the radio link, only one contact may be made with an antenna plug, and/or contact is made to a power supply. The reduced level of attention required by the user means that the mobile telephone can be inserted as a real secondary activity. Furthermore, the use of radio technology for communication between the mobile telephone and the device holder allows the development of device holders which are suitable for a large number of mobile telephones which have comparable technical characteristics, since attention need be paid only to the mechanical adaptation and, if need be, to the adaptation of a small number of contents.

If the contact between the mobile telephone and the device holder is dispensed with completely, this overcomes the requirement for mechanical contact which is reduced just to an integration function, that is to say to the task of connecting the mobile telephone to the arrangement. The shape of an integration unit such as this is no longer governed by the mobile telephone and now need be matched only to the attachment device. It is thus possible to provide the integration unit with a pleasant appearance, which matches the vehicle interior where it provides character. In particular, provision is made for the integration unit to completely cover the attachment device, and thus to optimally protect the electrical interface which is located between the integration unit and the attachment device. As a special form of a device holder, the integration unit can be removed from the attachment device, can be transported and can be fitted to any other attachment device, just like the device holder.

Advantageous and expedient developments of this fundamental idea are specified in the dependent claims.

For example, provision is made for the device holder to have an accommodation area in the form of a shell for insertion of the mobile telephone, allowing flexible matching of this accommodation area in the form of a shell. If required, this allows different mobile telephones from the same manufacturer to be inserted into the same accommodation housing, since the electrical and electronic matching can be carried out for a number of mobile telephones on the basis of one matched interface configuration.

The accommodation housing may preferably be in the form of a two-part or multipart housing, in particular with a variable upper shell, which is matched to the respective mobile telephone, interacting with a lower shell, which can be used universally and is matched to the attachment device. The housing parts can be manufactured such that an overall housing is formed only when the housing parts are joined together. In this case, the mechanical and electrical connecting elements between the upper part and lower part are designed such that a mechanical lock and an electrical connection between the parts are produced in response to a preferably longitudinal movement between the housing upper part and the housing lower part. In this case, for example, bayonet-like or rail-like connecting means, or connecting means with latching tabs, may be used.

The invention provides for the attachment device to be designed such that it can rotate or pivot at least in one spatial direction with respect to the mechanical and electrical contact link for the device holder or integration unit. This means that it is possible for the mobile telephone that is held in the device holder to be optimally aligned for the respective user and thus to ensure that the display of the mobile telephone can be viewed, and the keypad can be accessed, not only by the driver but also by the front seat passenger in an optimized position. Alignment of the integration unit to which no mobile telephone is fitted may also be desirable in order to align this with the attachment device in the vehicle such that all of the functional elements which are arranged alongside the integration unit are accessible optimally and without impediment.

One design variant of the invention provides for at least one switch or pushbutton, by means of which a special facility can be initiated, to be provided on the attachment device and/or device holder and/or integration unit. In this case, this refers in particular to initiation of an emergency call in the event of an accident, or to call a breakdown service. Provision is also made for the switch or pushbutton to be arranged on the attachment device, such that it is concealed by the device holder or integration unit. This avoids inadvertent incorrect operation of this key. One design variant of the invention provides for the switch to be arranged in a concealed manner on the attachment device or on the device holder and/or on the integration unit. A cover or flap which covers the switch can be removed or folded up manually. Furthermore, this also refers to the automation of the release of the switch. With a design such as this, the opening of the cover or flap is controlled by an event. An event may, for example, be the signal from an acceleration sensor, an inclination monitor or the initiation of an airbag. Furthermore, provision is made, for example, for using the increased acceleration or deceleration that occurs in the event of an accident directly for making the emergency call button accessible.

The invention also provides for the attachment device and/or the device holder and/or the integration unit to be equipped with at least one indicating element. This allows operating states, in particular of the mobile telephone or of the device holder and/or of the integration unit, to be visualized. For example, following successful integration and insertion of the mobile telephone in the device according to the invention, and/or provision of the convenience device, this refers to an optical conductor, which is arranged on the attachment device, being made to illuminate with a green light. This symbolizes the operating state of the arrangement or of the mobile telephone to the user at a point by a means which can also be seen when it is dark and which is intuitively associated with the arrangement or with the mobile telephone. Furthermore, for example in the event of loss of contact with the mobile radio network, provision is made for the optical conductor to be made to illuminate with an orange light. When the device holder or the integration unit is removed, provision is made for the attachment device to symbolize its position and the fact that it is not functional to the user by light means that emit red light.

Furthermore, provision is made for the vehicle occupants to be made aware of different states of the arrangement by means of an active response and/or a changing appearance of the indicating elements. A change in the color of the indicating elements and/or a change in the light intensity and/or a change in the light duration mean that it is possible using simple means to display a large number of different state information items for the occupants. Visual information signals which differ in the light intensity and/or light rhythm can be understood without any problems by occupants who are color blind.

One advantageous embodiment of the idea of the invention provides for the light elements to be arranged in the form of a crown or ring on the holder, with the light elements preferably emitting the same signal. This means that the signal is visible in all directions, irrespective of the installation location of the holder. When using two or more light elements which are indicated in the same information, rolling operation of the light elements is also provided. In this mode, the individual light elements successively reproduce the information to be indicated. This allows cautionary indication of information, which nevertheless draws the attention of the occupants.

Advantageous and expedient exemplary embodiments of the invention will be explained in the following description of the exemplary embodiments, together with an indication of further advantages, and are illustrated in the drawings, in which.

Figure 2:
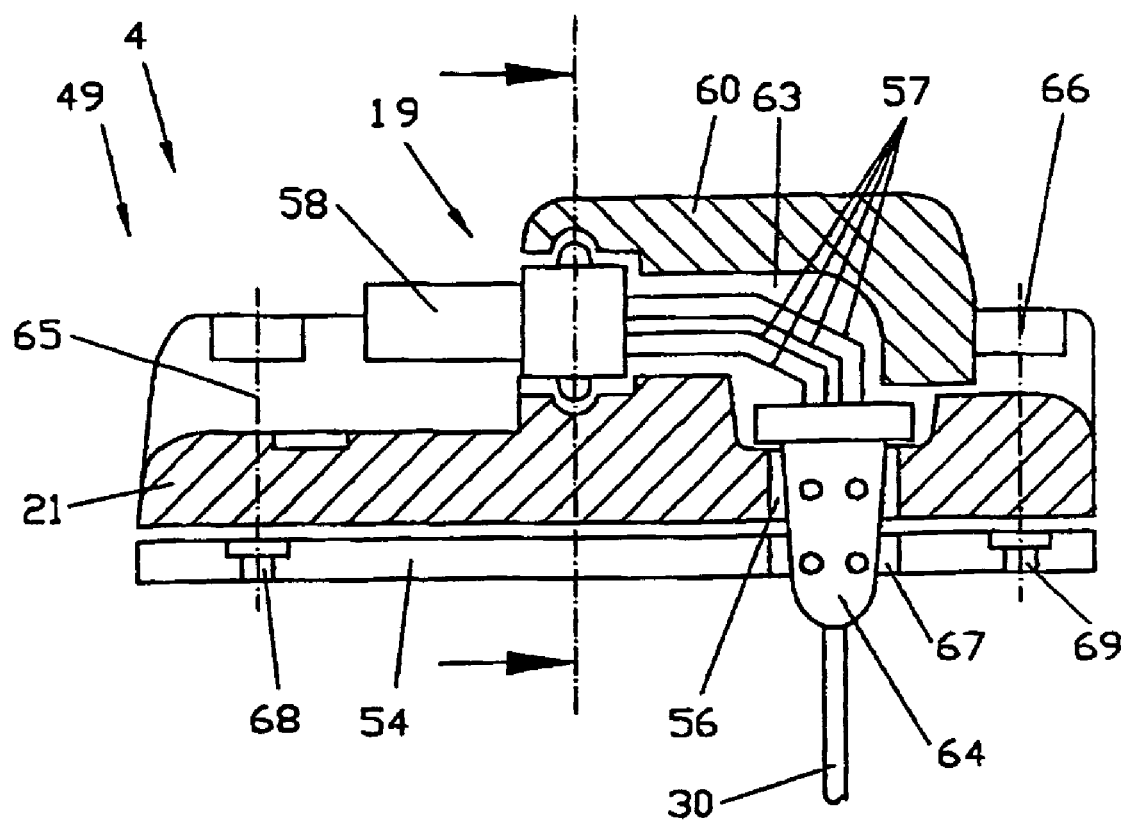
FIG. 2 shows a section through an attachment device.
Figure 3:
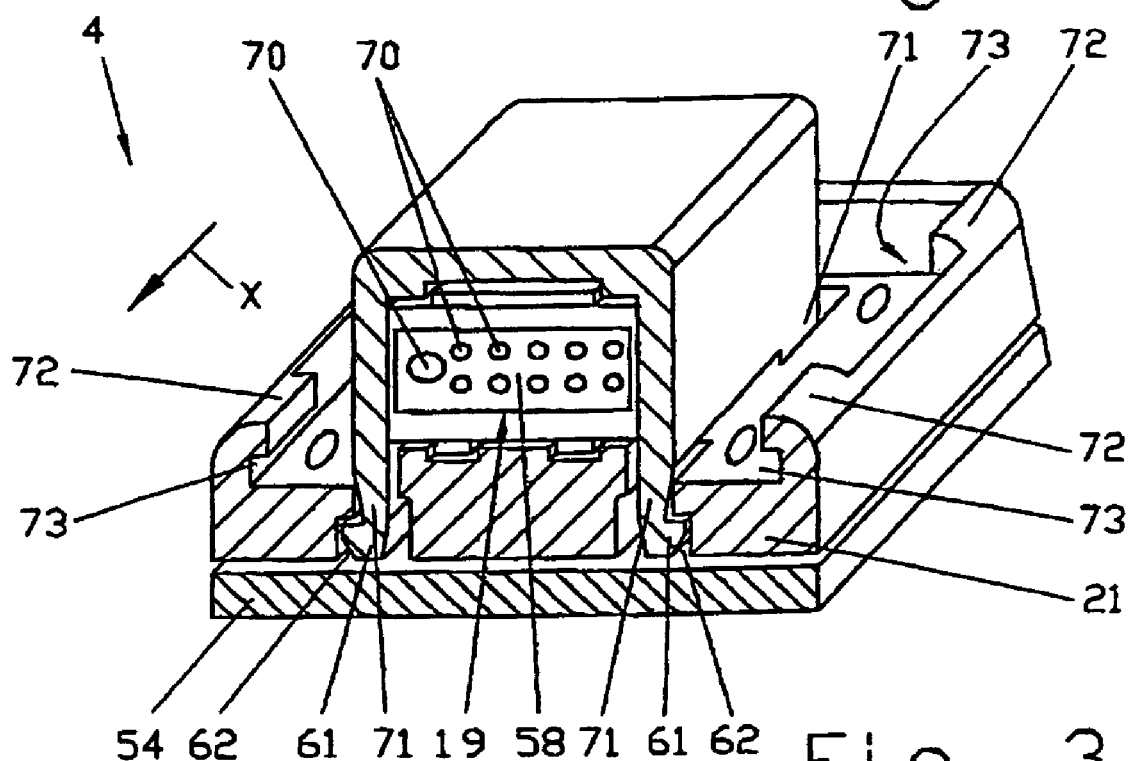
Figure 4:
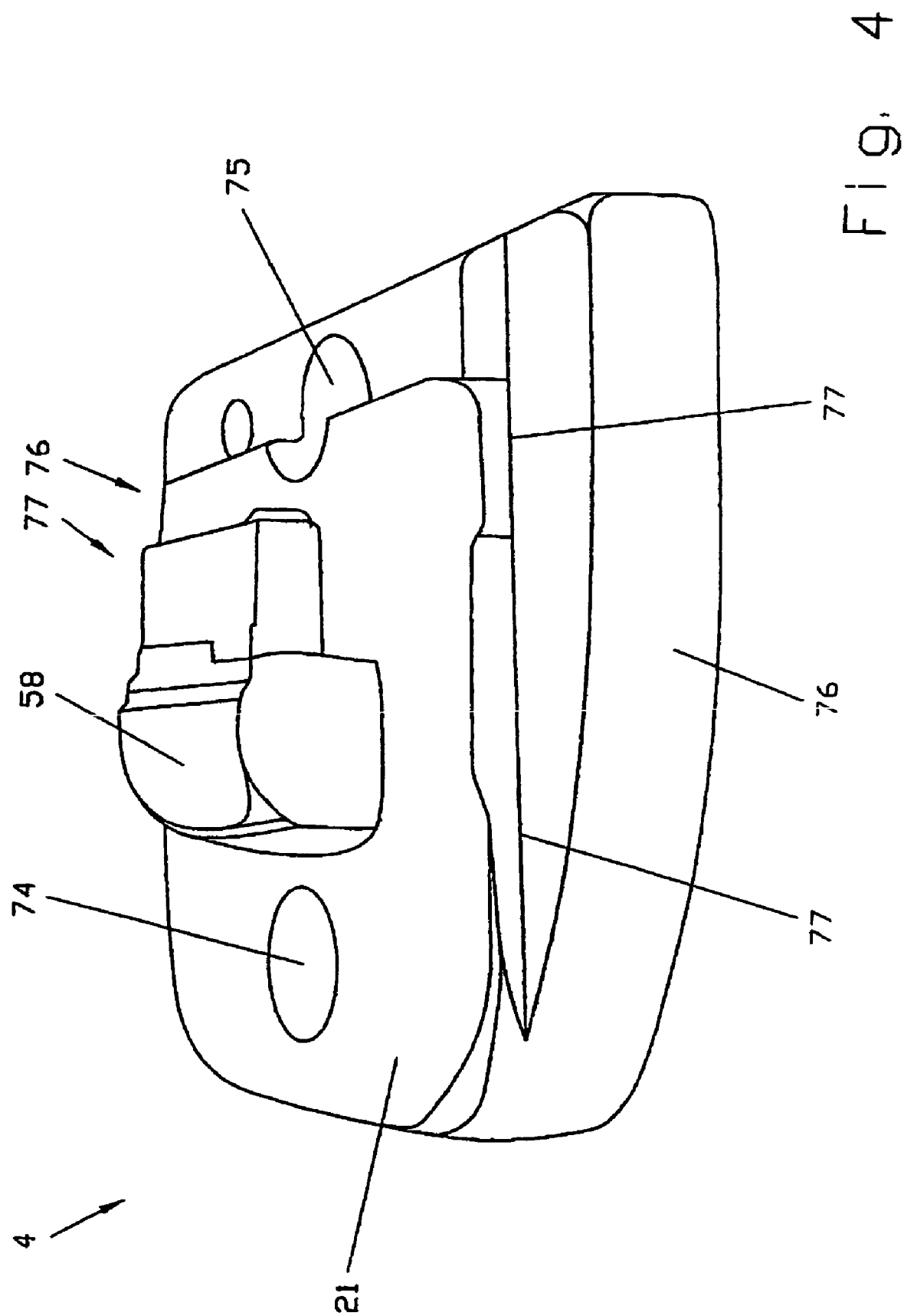
Figure 5:
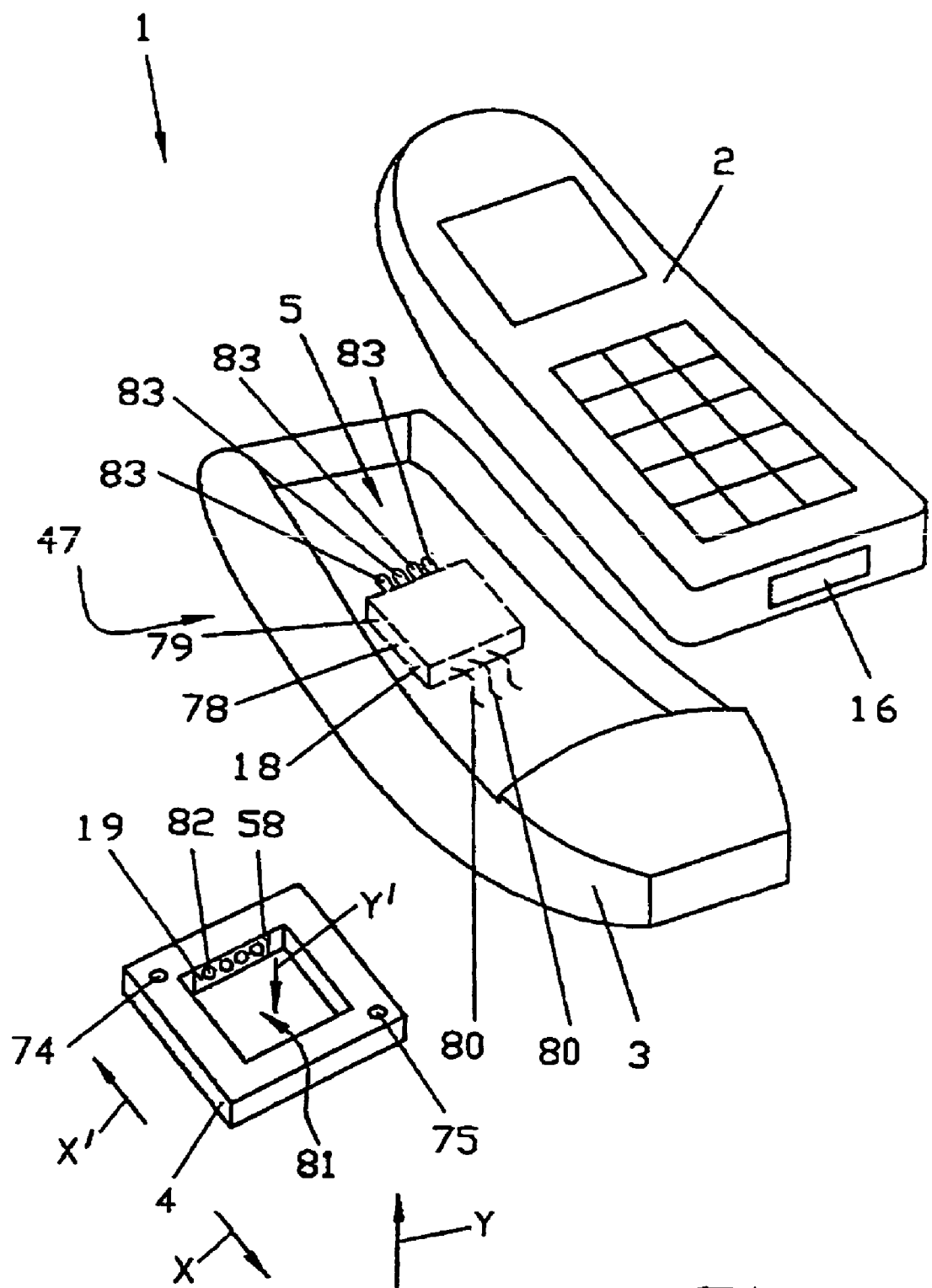
Figure 9:
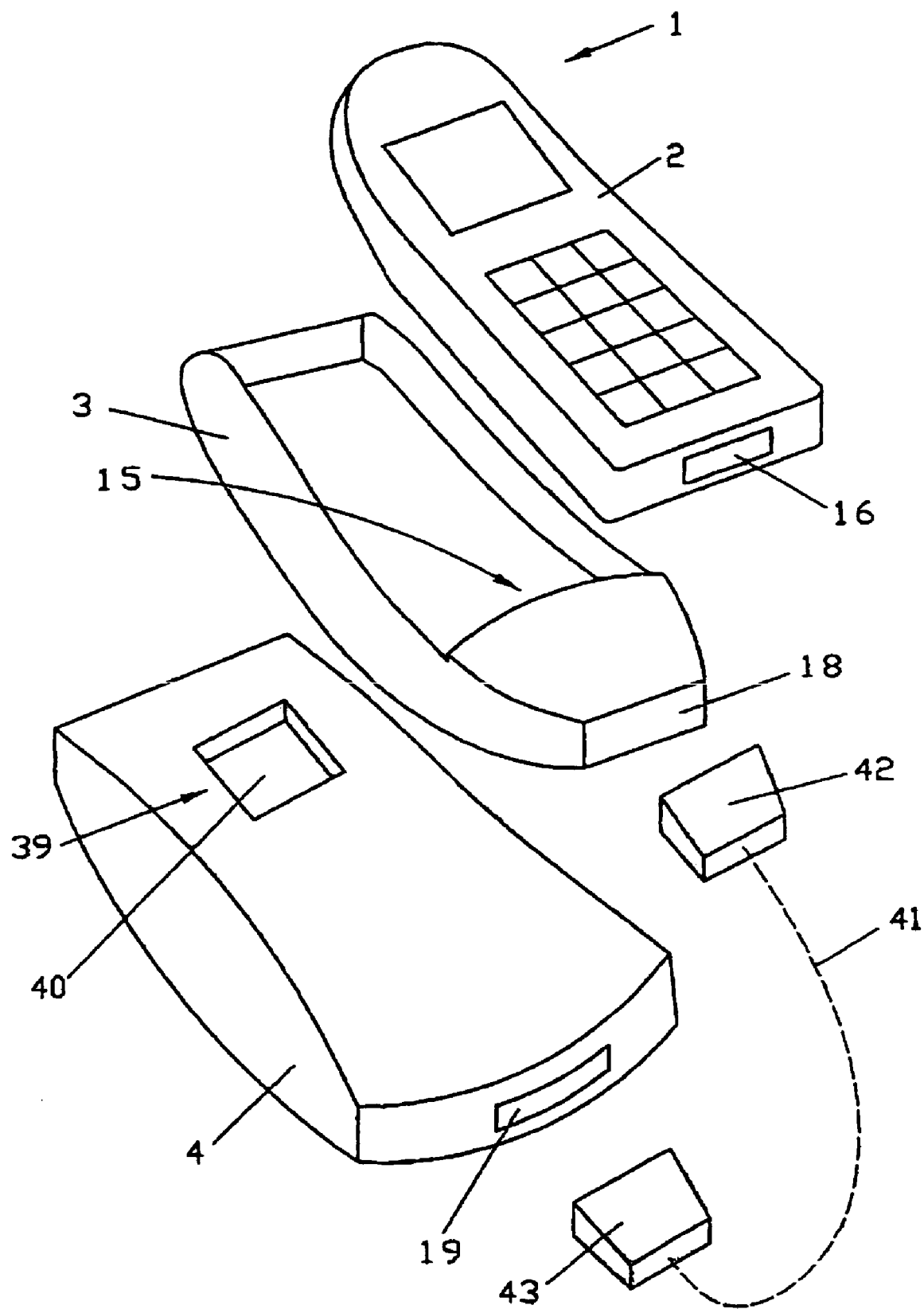
Figure 10:
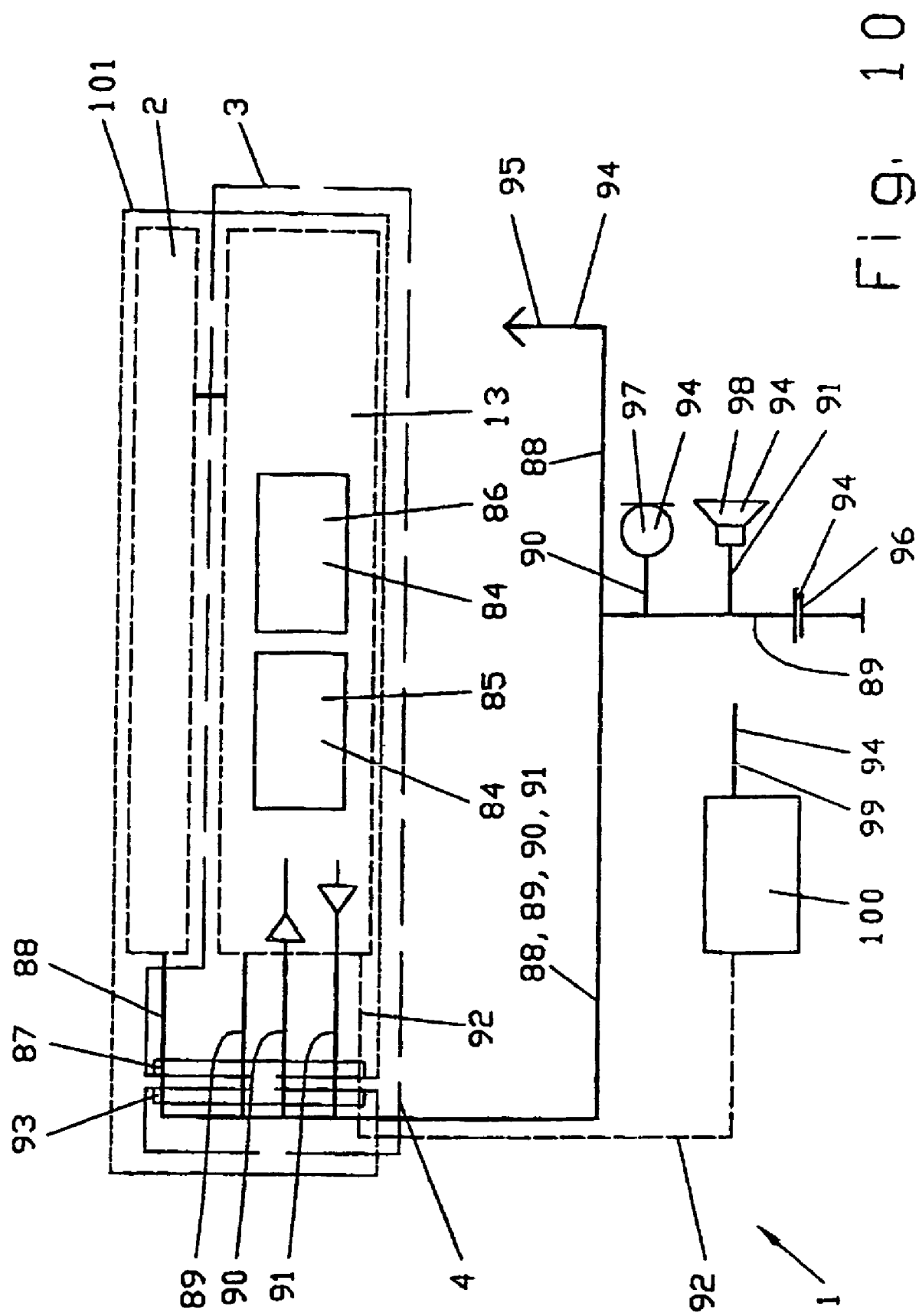
Figure 11:
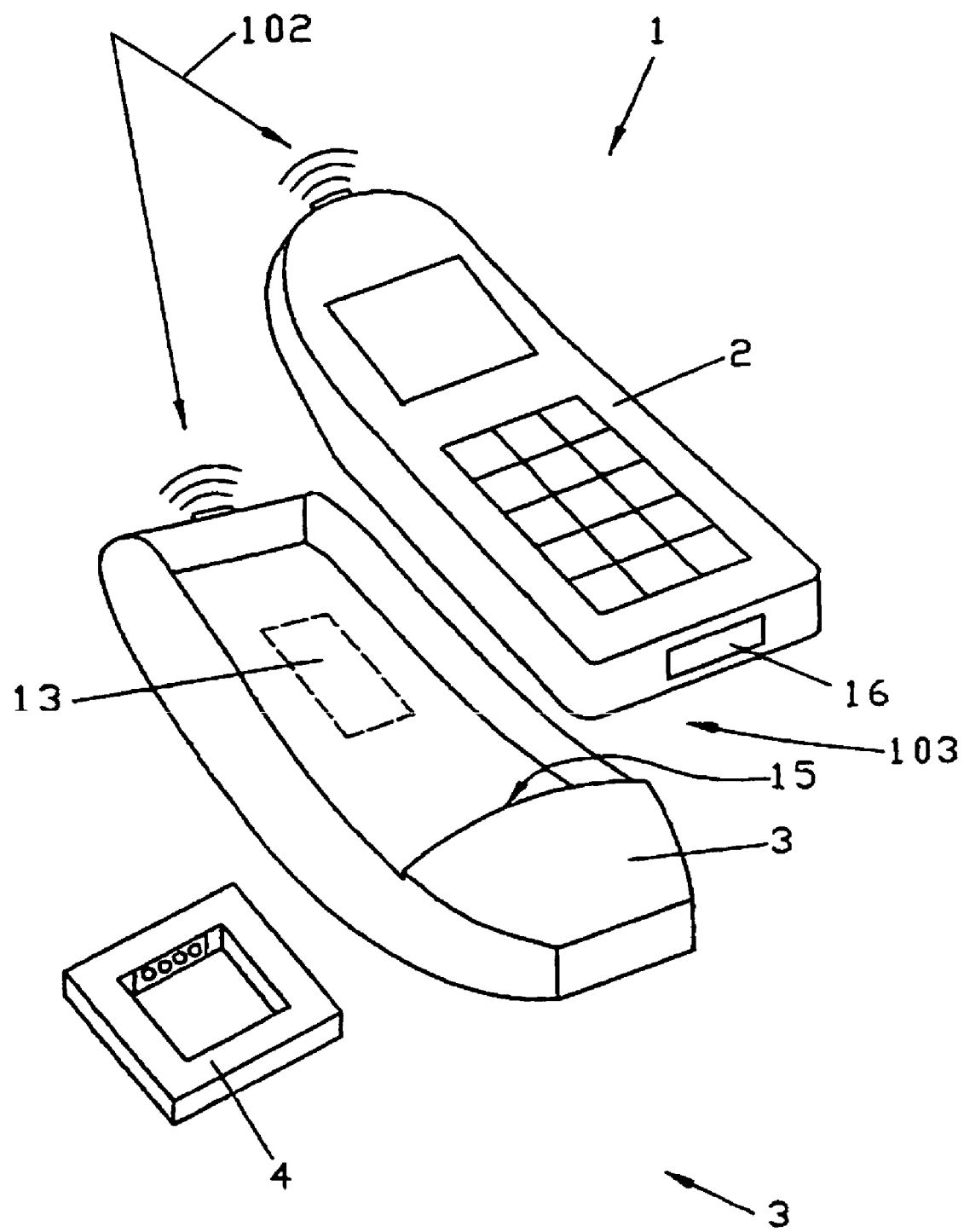
Figure 12:
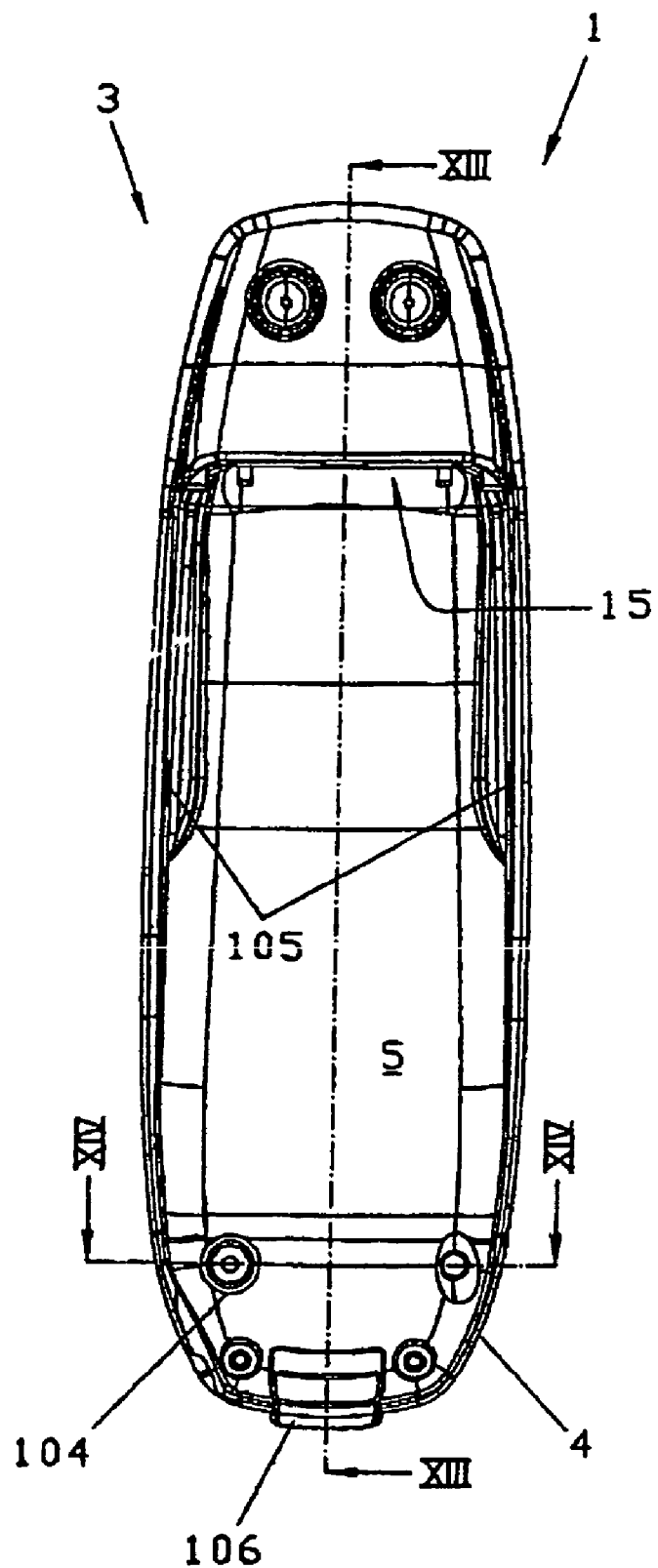
Figure 13:
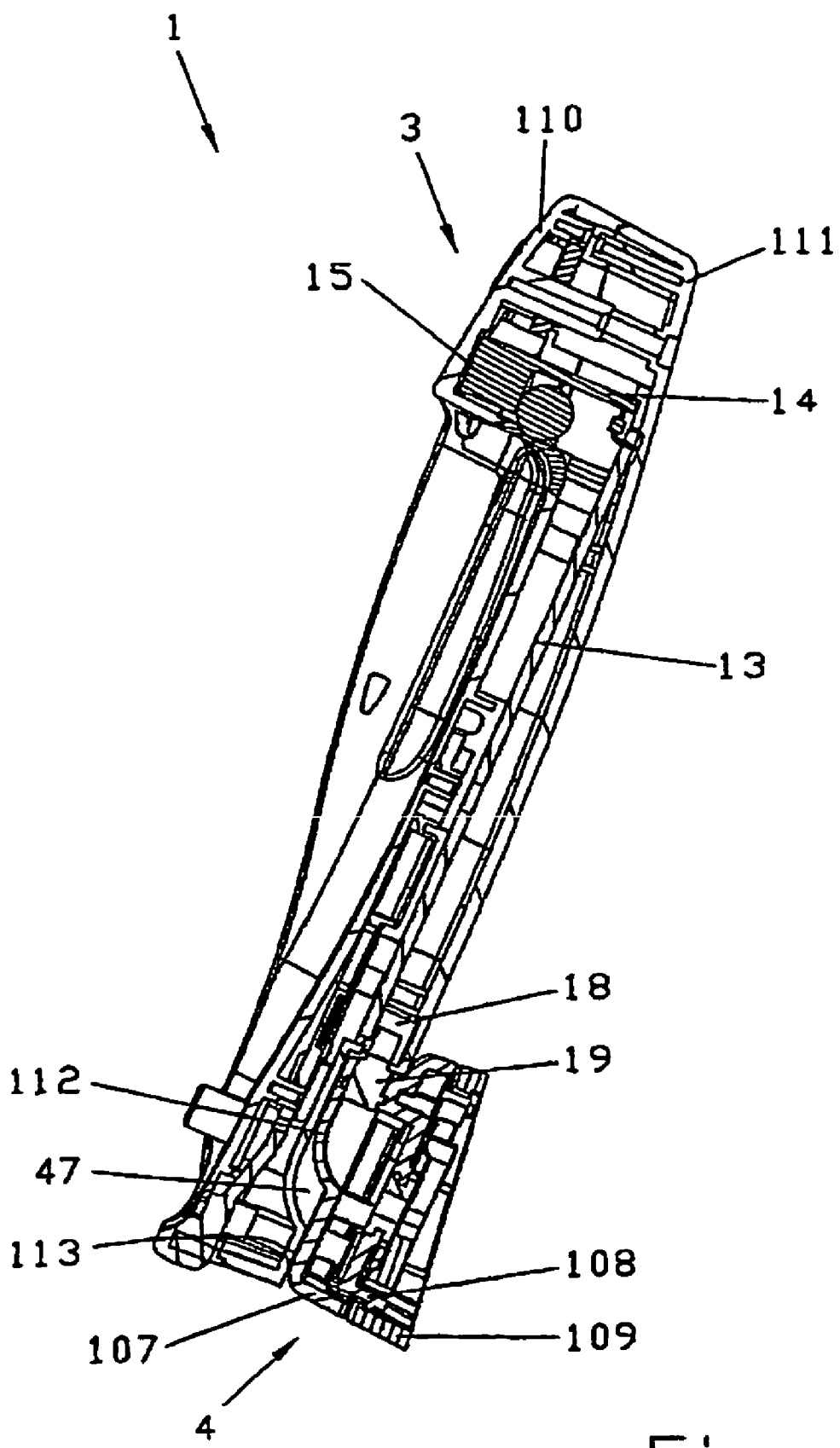
Figure 14:
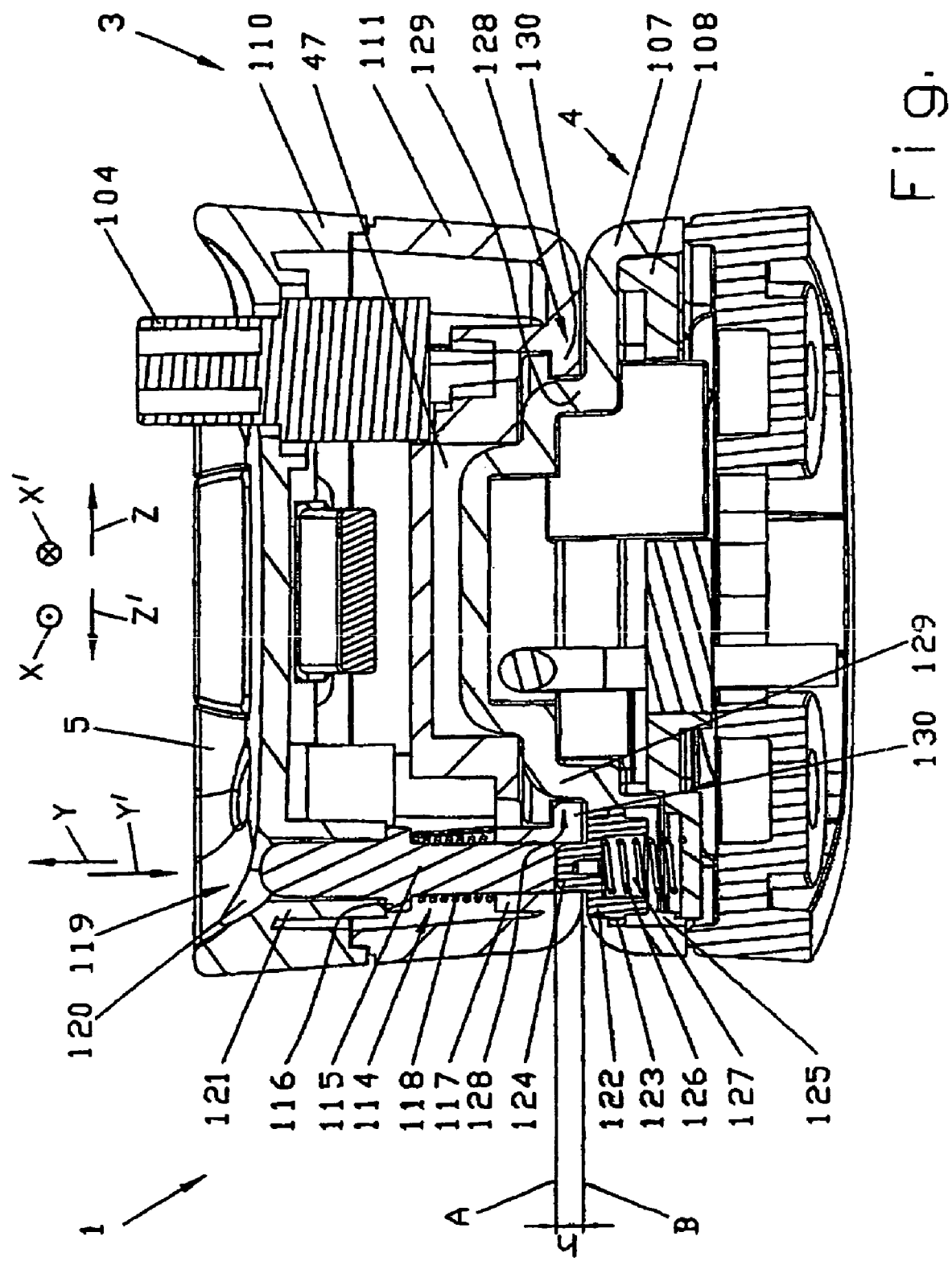
Figure 17:
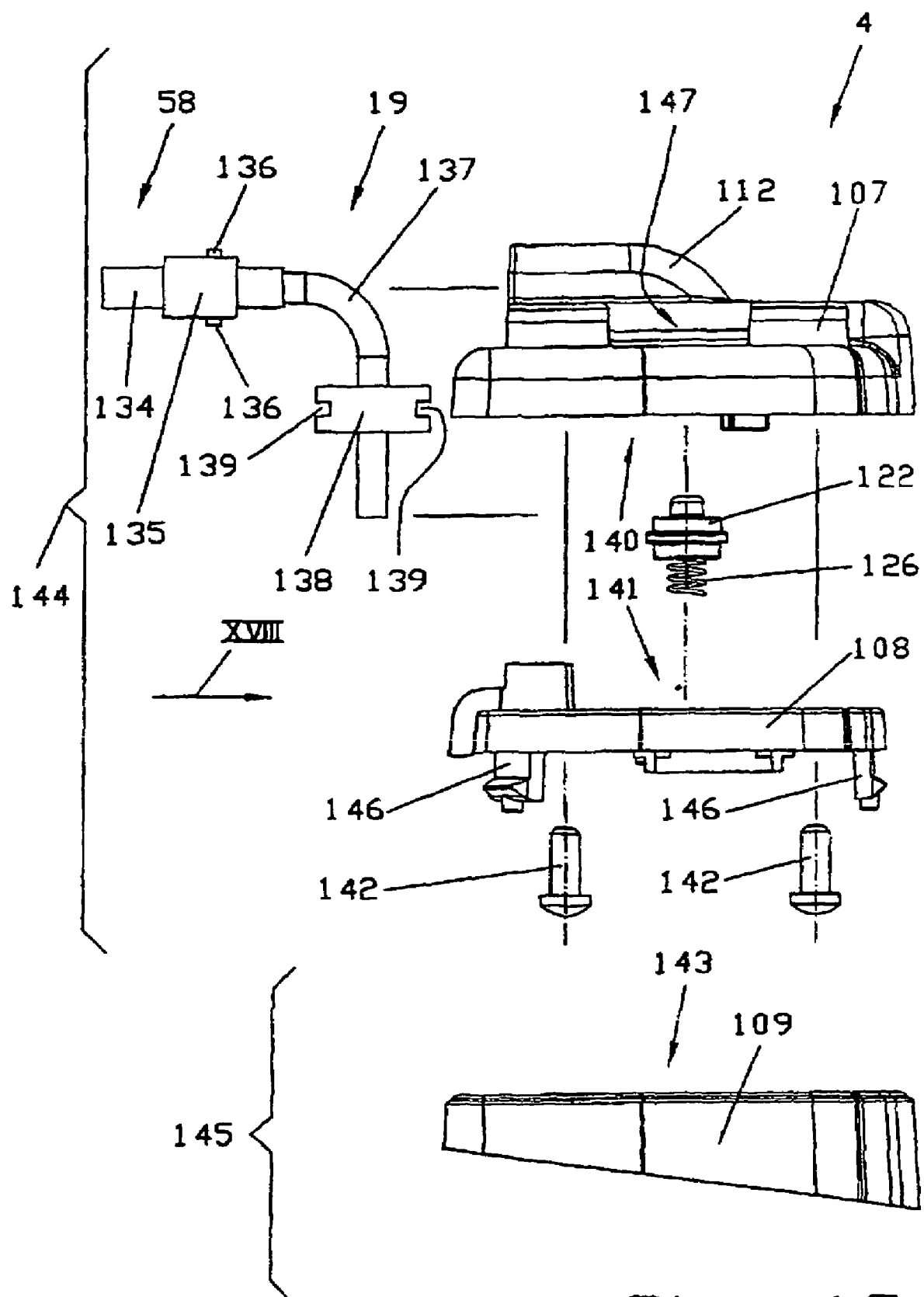
Figure 19:
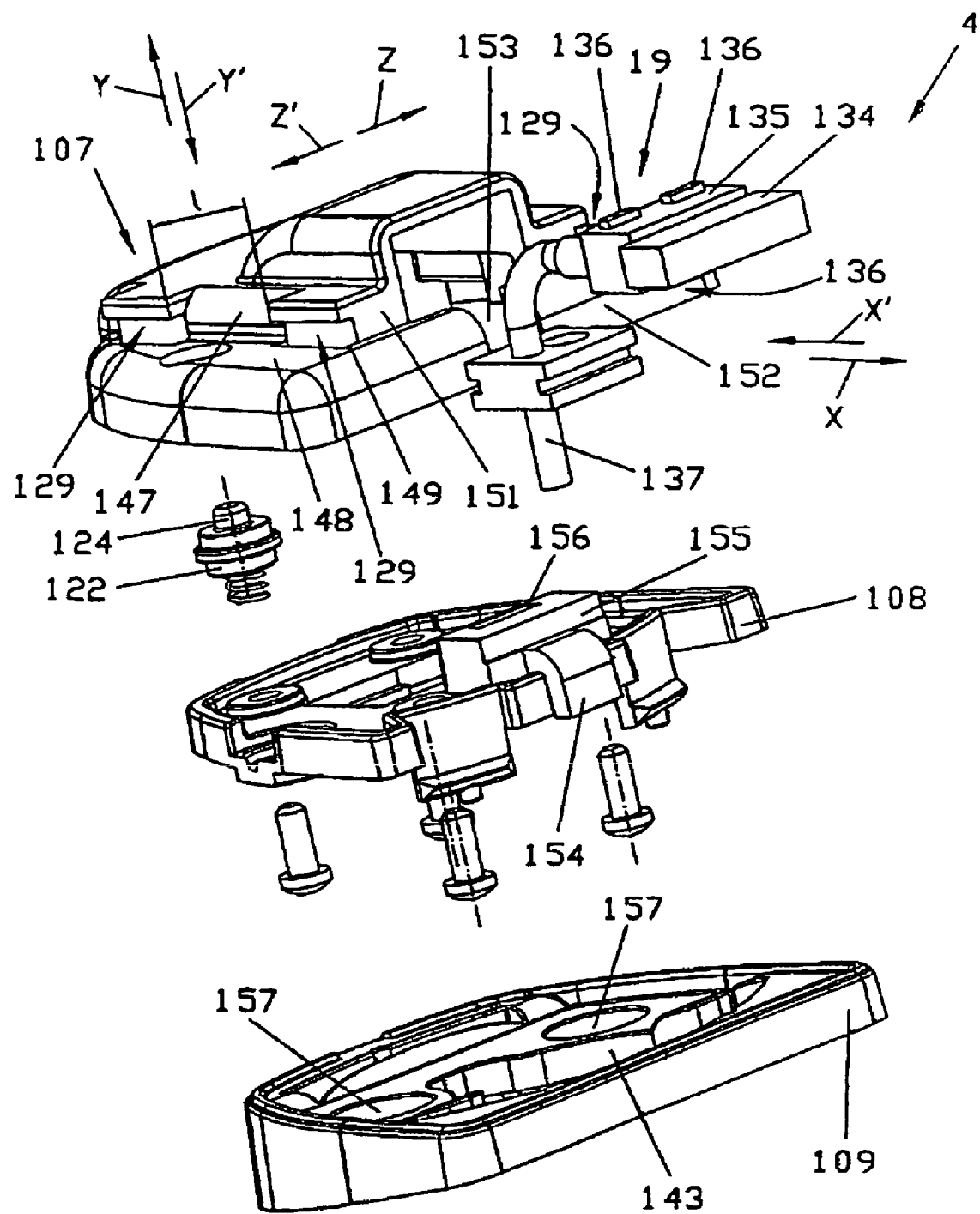
Figure 20:
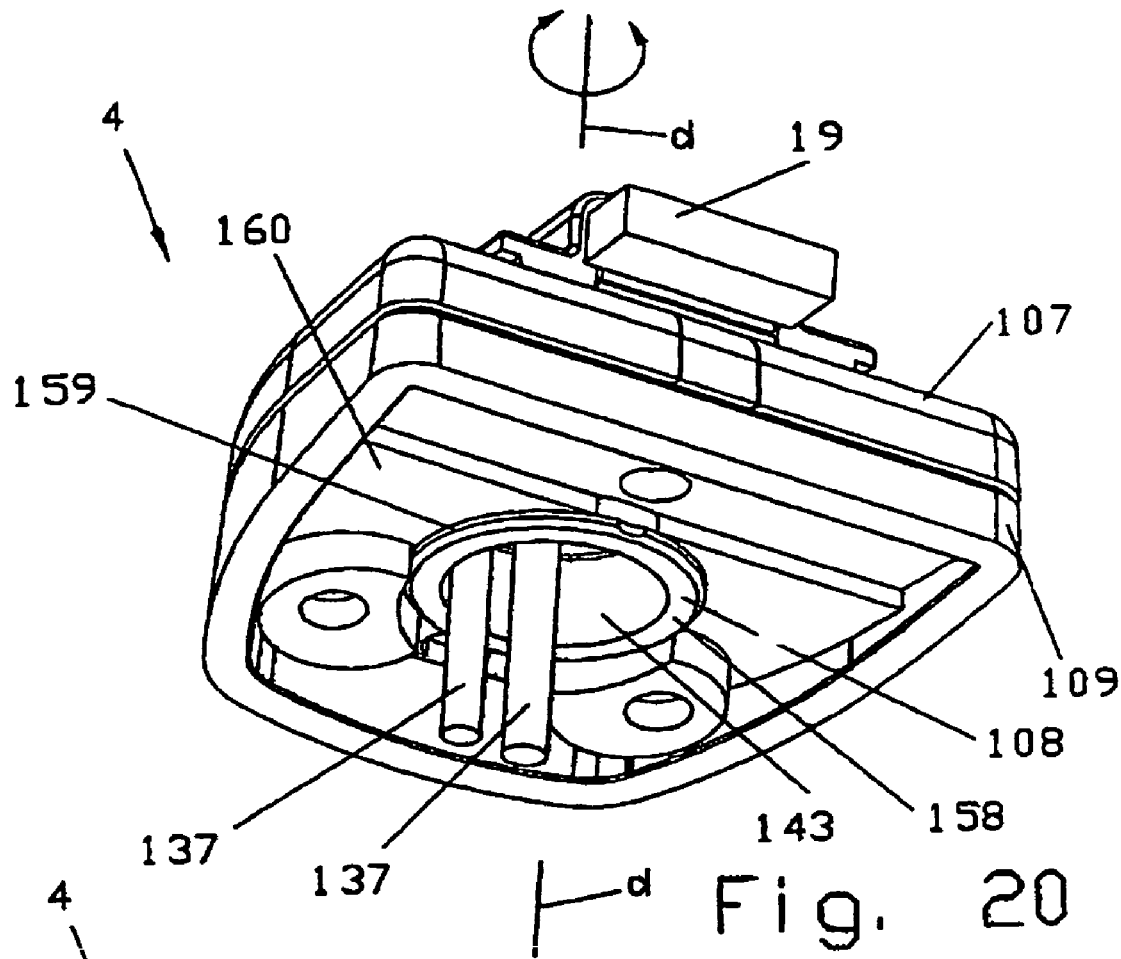
Figure 21:
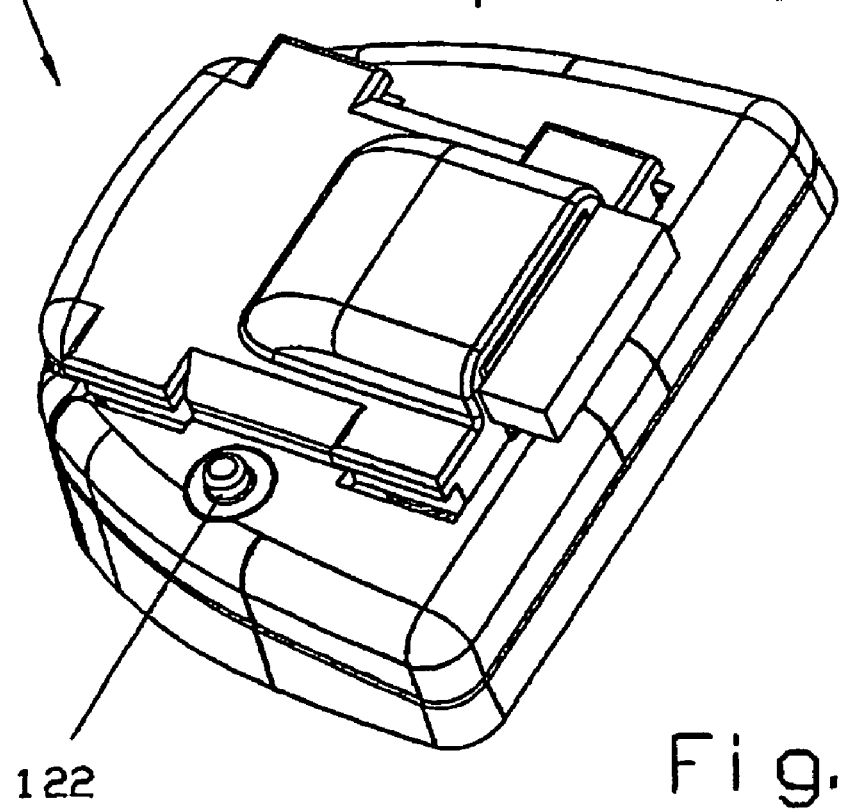
Figure 22:
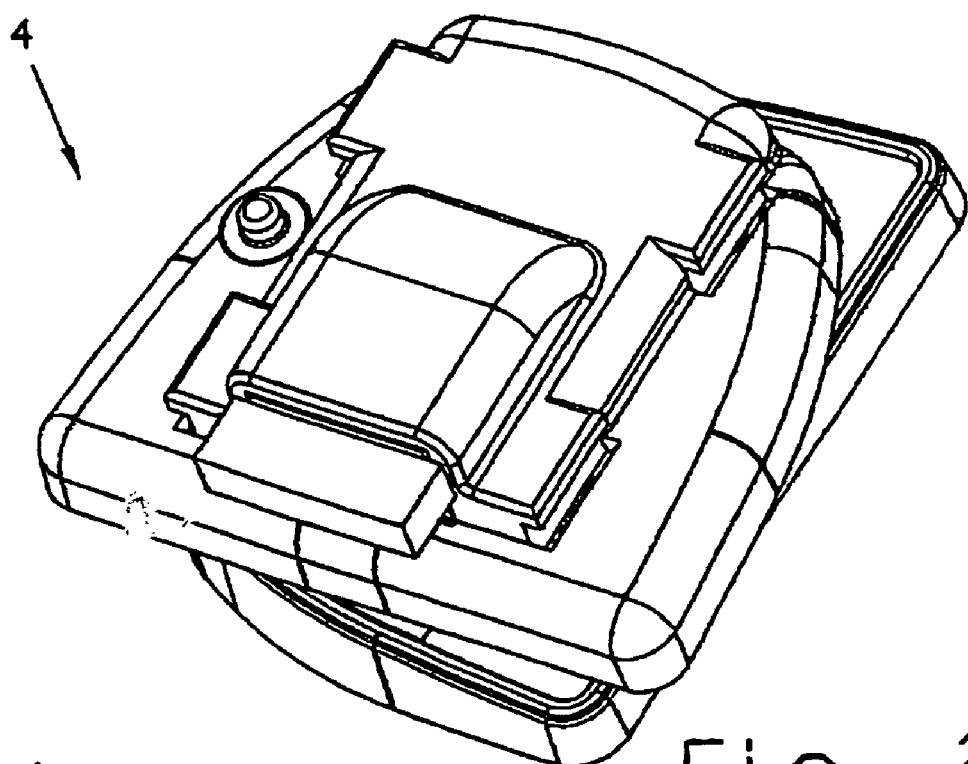
Figure 23:
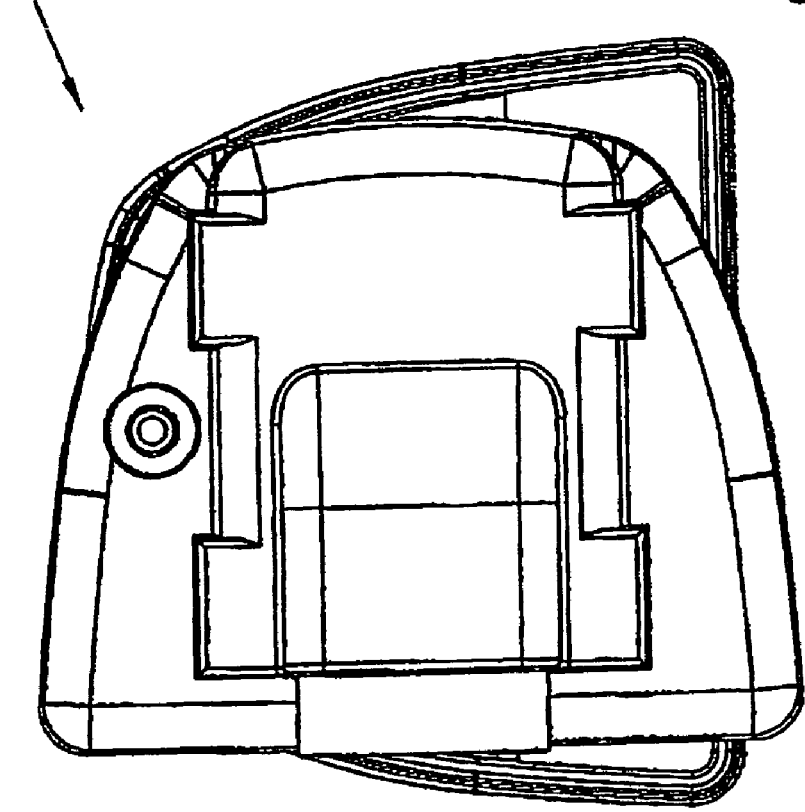
Figure 24:
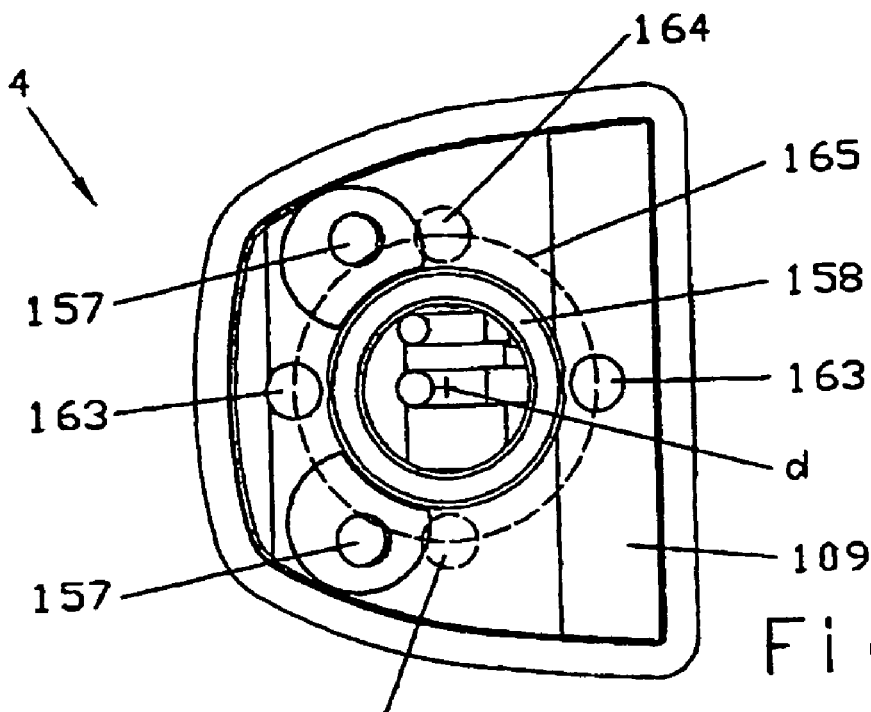
Figure 26:
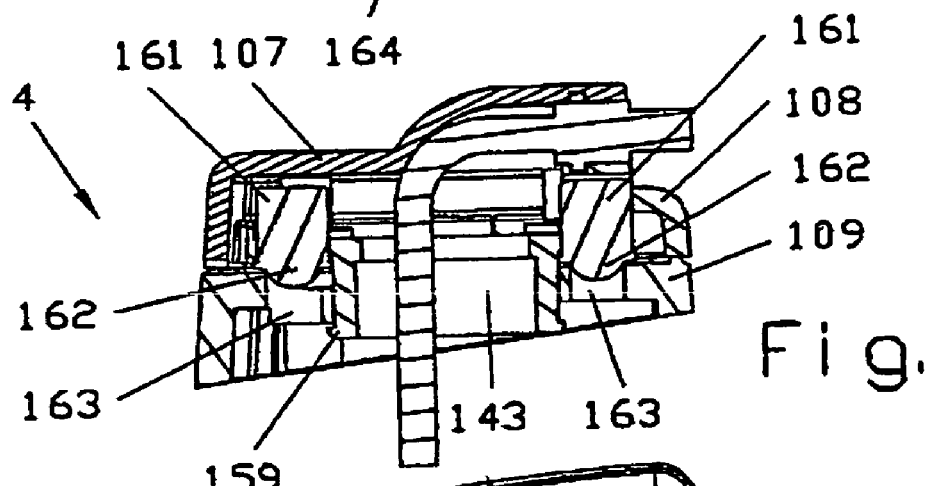
Figure 25:
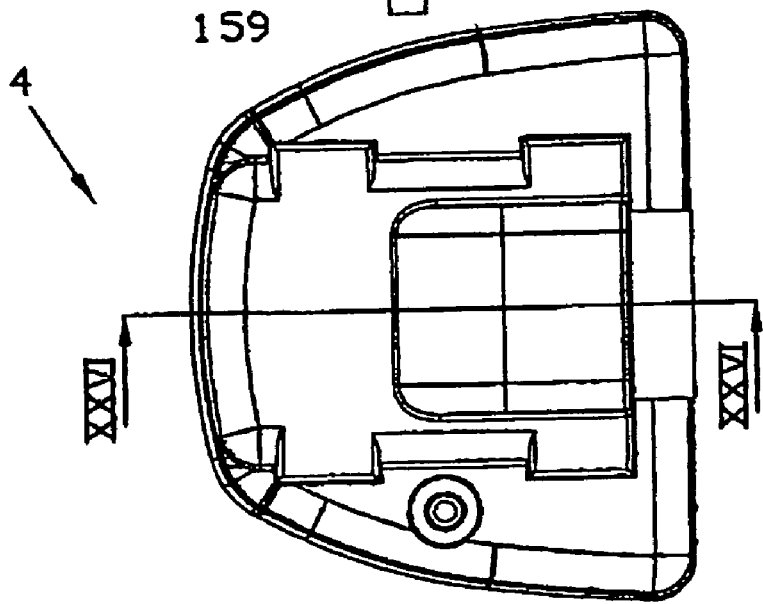
Figure 27:
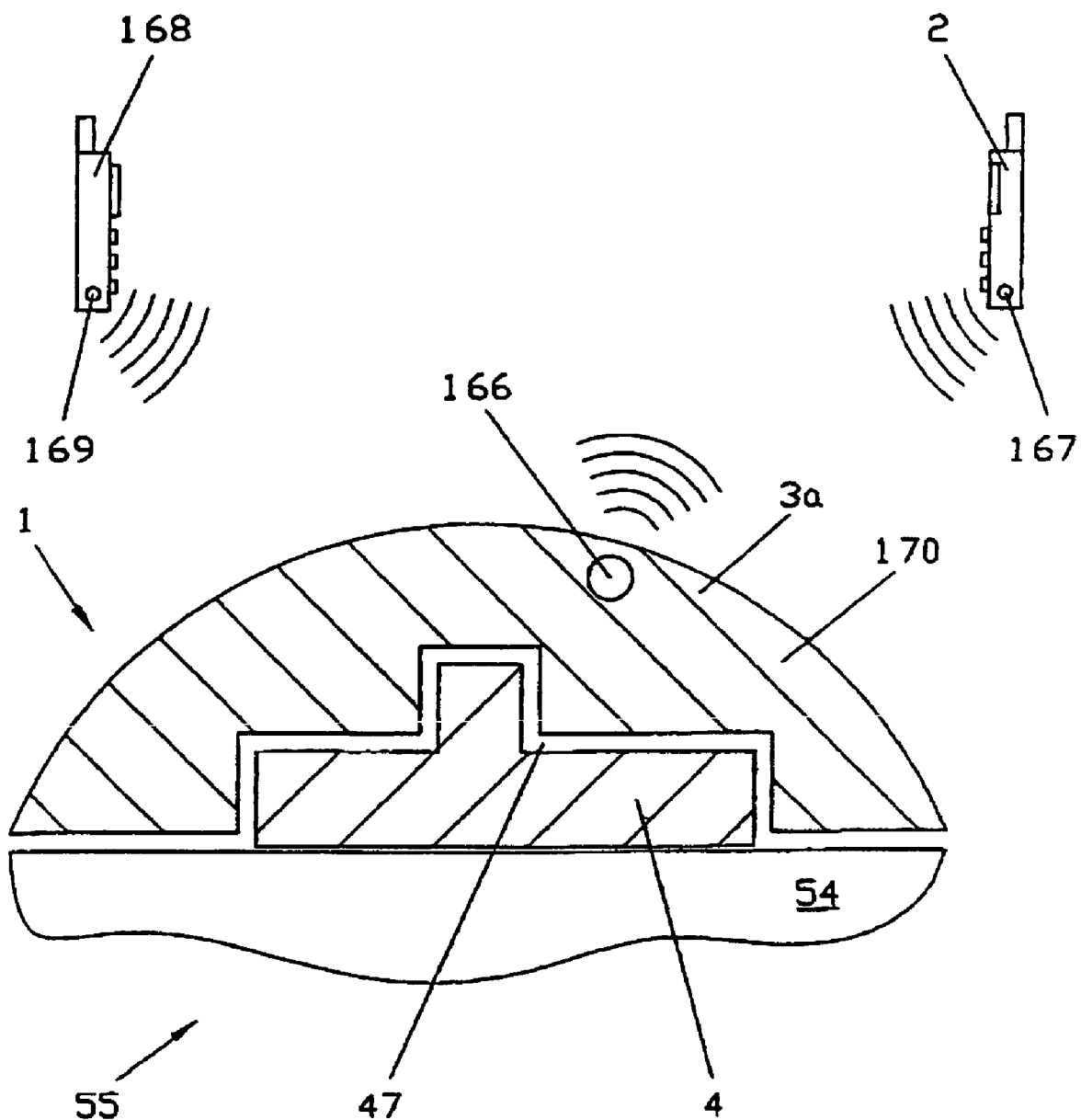
Figure 28:
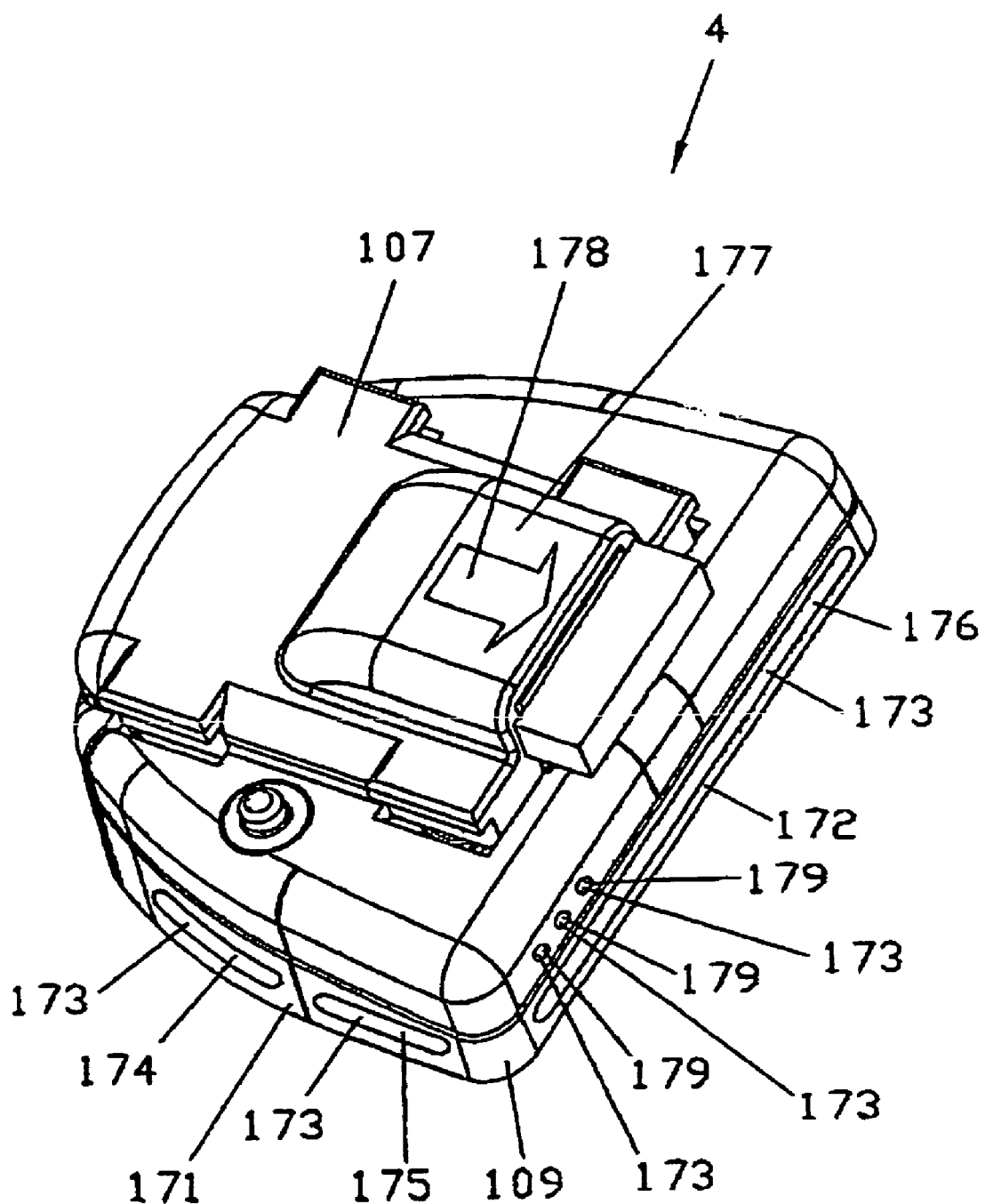
Figure 29:
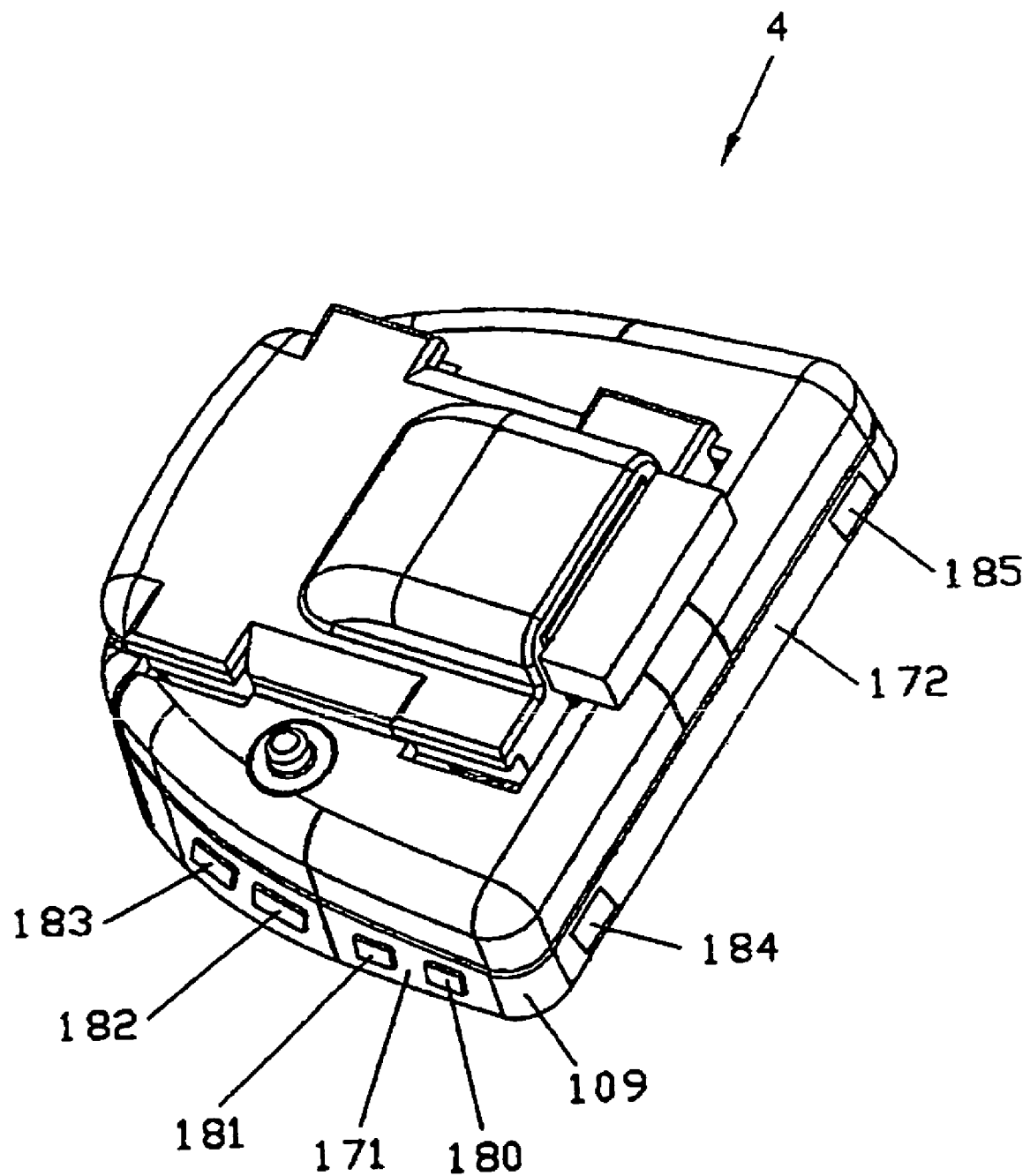
Figure 30:
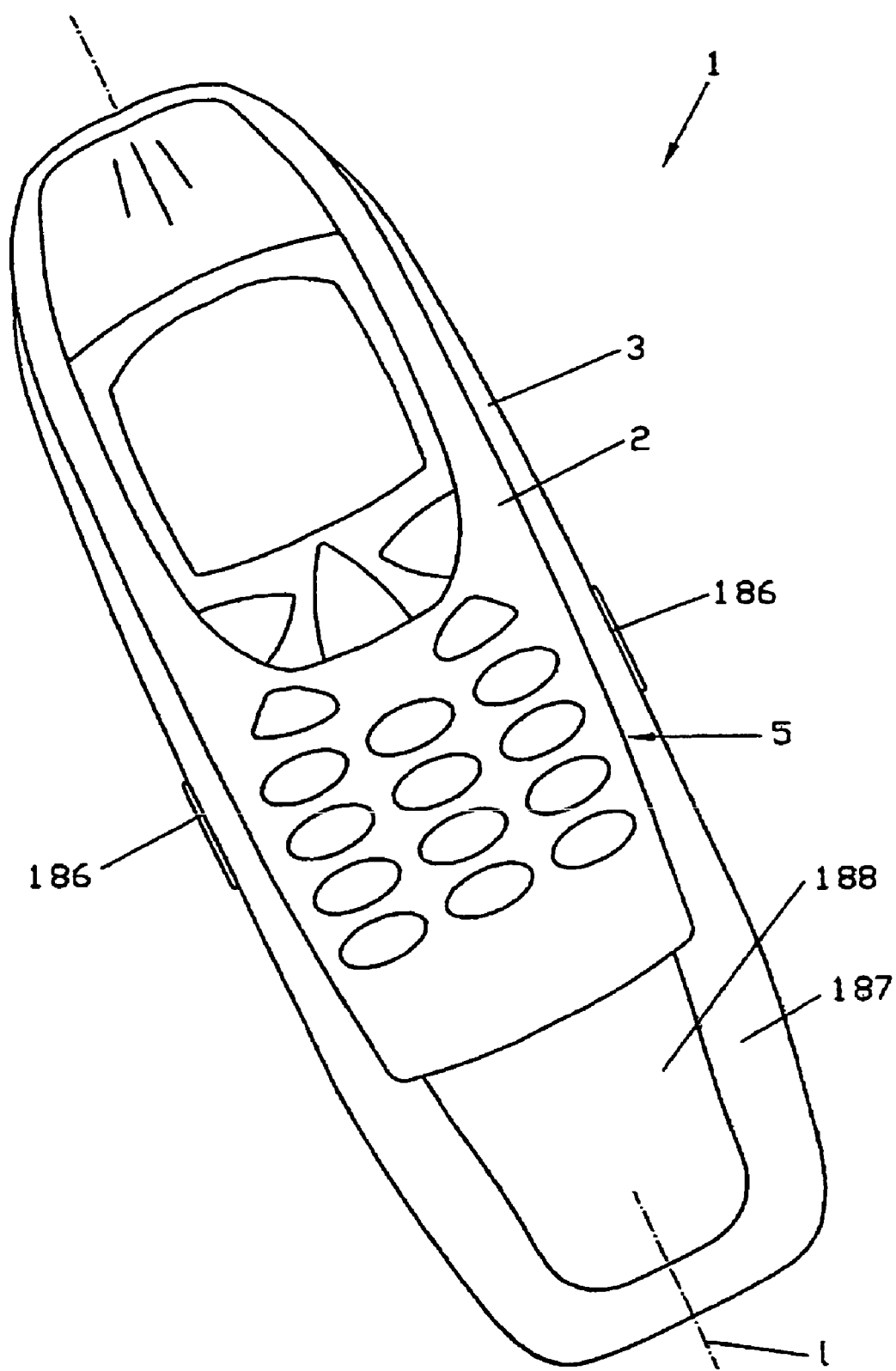
Figure 31:
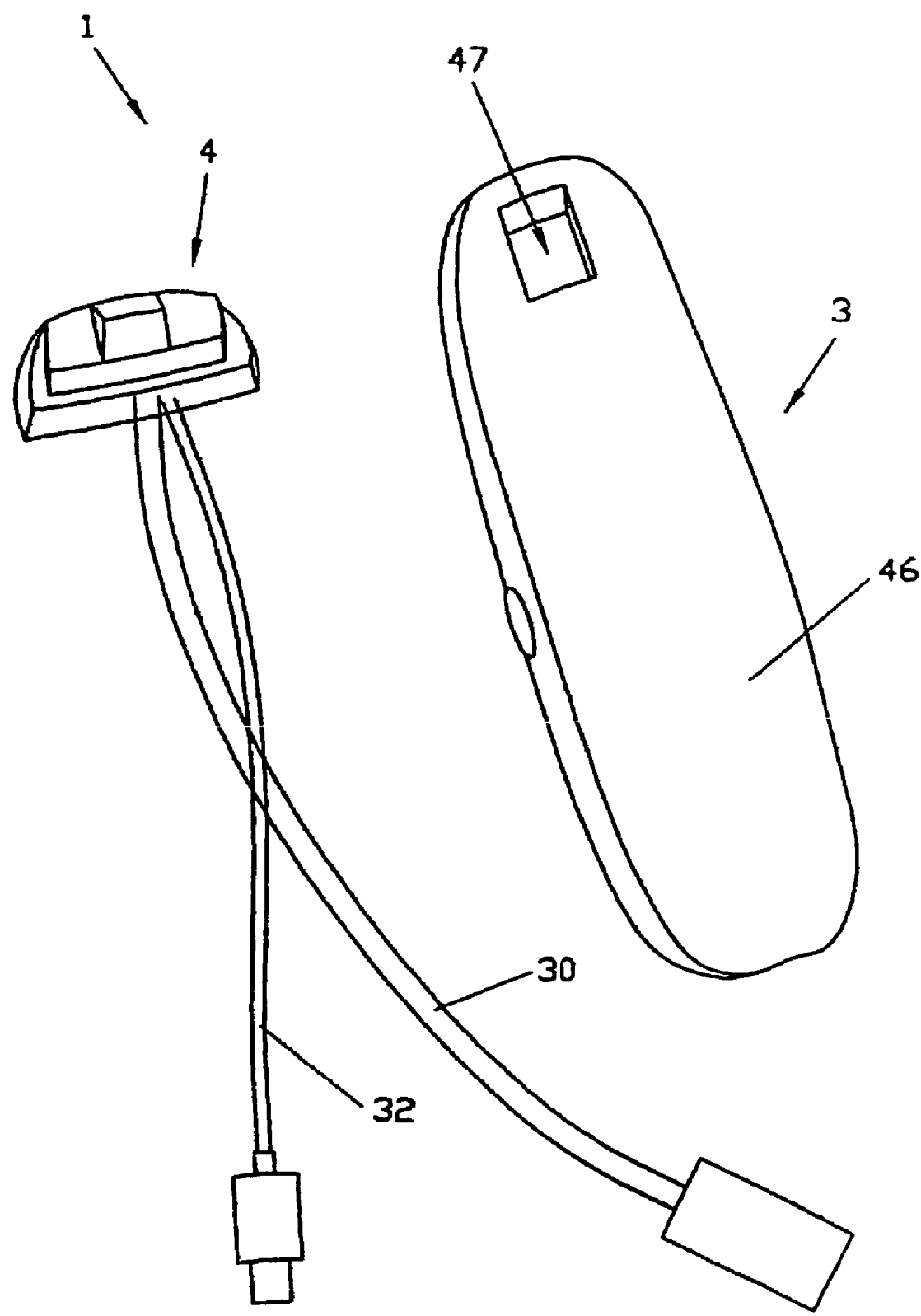
Figure 32:
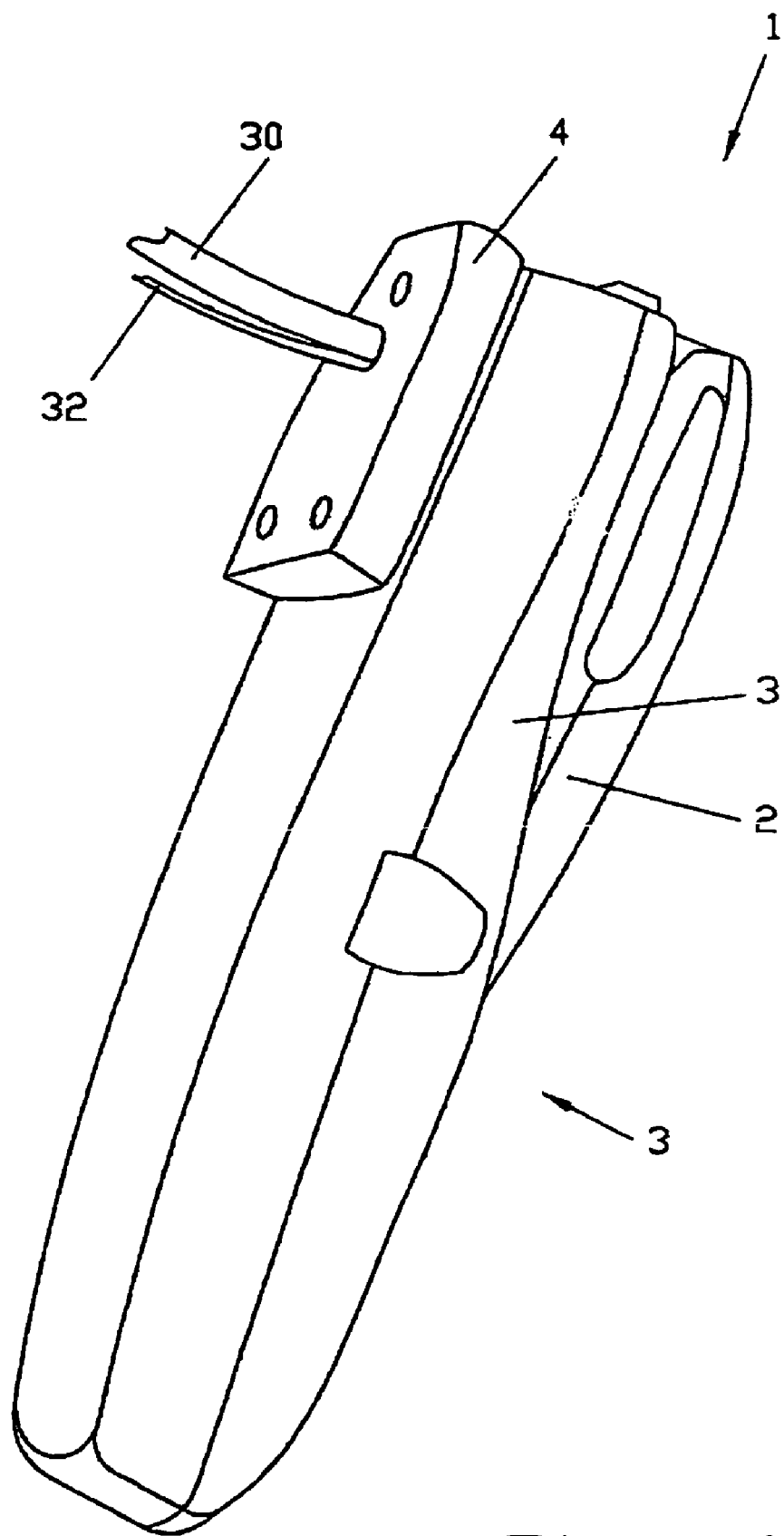

FIG. 3 shows a perspective illustration of the attachment device as shown in FIG. 2, FIG. 4 shows a perspective illustration of a further attachment device, FIG. 5 shows a further illustration of an arrangement according to the invention with a mobile telephone, FIG. 6 shows a side view of an arrangement according to the invention with a mobile telephone inserted, FIG. 7 shows an end view of the arrangement illustrated in FIG. 6, FIG. 8 shows a plan view of the housing holder illustrated in FIG. 6, without a mobile telephone, FIG. 9 shows a perspective view of a further arrangement according to the invention, FIG. 10 shows a schematic view of an arrangement according to the invention, FIG. 11 shows a perspective view of a further arrangement according to the invention, FIG. 12 shows a plan view of a device holder which is connected to an attachment device, FIG. 13 shows a section through the arrangement illustrated in FIG. 12, along the section line XIII-XIII, FIG. 14 shows a section through the arrangement illustrated in FIG. 12, along the section line XIV-XIV, FIG. 15 shows a perspective view from underneath of the device holder illustrated in FIG. 12, FIG. 16 shows a further perspective view from underneath of the device holder illustrated in FIG. 12, FIG. 17 shows a side view of the attachment device illustrated in FIG. 12, as an exploded illustration, FIG. 18 shows a view of the attachment device illustrated in FIG. 17, from the direction of the arrow XVIII, FIG. 19 shows a perspective view of the exploded illustrations of the attachment device as shown in FIGS. 17 and 18, FIG. 20 shows a perspective view of one embodiment variant of an attachment device, FIG. 21 shows a further perspective view of the attachment device illustrated in FIG. 20, FIG. 22 shows a perspective view of the attachment device illustrated in FIGS. 20 and 21, in a pivoted position, FIG. 23 shows a plan view of the attachment device illustrated in FIG. 22, FIG. 24 shows a view from underneath of the attachment device illustrated in FIG. 20, FIG. 25 shows a plan view of the attachment device illustrated in FIG. 20, FIG. 26 shows a section through the attachment device illustrated in FIG. 25, along the section line XXVI-XXVI, FIG. 27 shows a side view of one embodiment variant of an arrangement according to the invention, which comprises an attachment device and an integration unit, FIG. 28 shows a perspective view of an attachment device with indicating means, FIG. 29 shows a perspective view of an attachment device with switches, FIG. 30 shows a view of a further device holder with a mobile telephone inserted, FIG. 31 shows a perspective view of the device holder illustrated in FIG. 30, from the rear, and of an attachment device which is associated with it and is illustrated separately, FIG. 32 shows a perspective view of the components illustrated in FIGS. 30 and 31, in the coupled state, FIG. 33 shows an embodiment variant of the electrical and mechanical contacts, as described in FIGS. 13 to 25, between the device holder and the attachment device, FIG. 34 shows a further embodiment variant to that in FIG. 33, FIG. 35 shows a further embodiment variant to that in FIG. 33, FIG. 36 shows a further embodiment variant to that in FIG. 33, and FIG. 37 shows an illustration of the embodiment variant illustrated in FIG. 36, together with an attachment device in the installed state.

DESCRIPTION OF THE INVENTION

Figure 1:
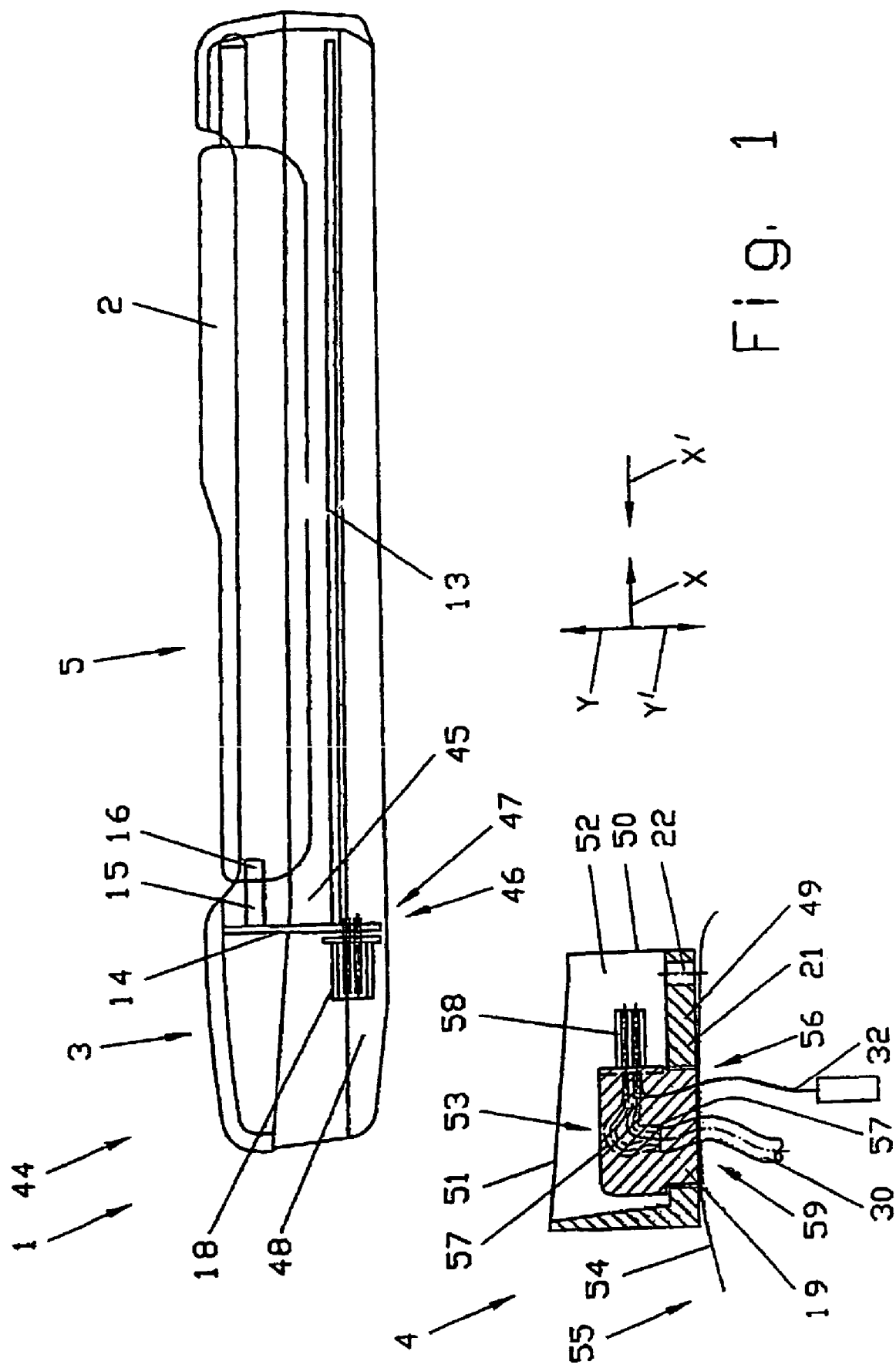
FIG. 1 shows a side view of an arrangement according to the invention.

FIG. 1 shows a side view of an arrangement 1 according to the invention with a mobile telephone 2. The view according to the invention essentially comprises a device holder 3, in which the mobile telephone 2 is inserted, and an attachment device 4. The device holder 3 holds the mobile telephone 2 in a recess 5 in the form of a trough and, with this mobile telephone 2, forms a convenient usage unit 44, essentially in the form of a slightly enlarged mobile telephone. The device holder 3 is illustrated with side views running in different planes. Two boards 13, 14 which are connected to one another are arranged in a space 45 inside the device holder 3. The board 13 is fitted with electronic components, which are not illustrated but which form, for example, an audio amplifier for amplification of audio signals for loudspeakers which are located in the vehicle, or a charging circuit for charging rechargeable batteries in the mobile telephone 2. The electronic components that are not illustrated may also, for example, form a noise suppression system, which is not illustrated, or a speech recognition system, which is arranged in the space 45 inside the device holder 3. A system plug 15 is arranged on the board 14 and makes contact with a connecting plug 16 on the mobile telephone 2 when the mobile telephone 2 is inserted. The system plug 15 is connected to a plug element 18, which is arranged on the board 14, via conductor tracks which are not shown but are likewise located on the board 14. The plug element 18 is also connected to the systems which are arranged on the board 13, with there also being connections between the system plug 15 and these systems. In the area of the plug element 18, the device holder 3 has a recess 47, which forms a space 48 surrounding the plug element 18, in a bottom area 46 which is opposite the recess 5 in the form of a trough. The attachment device 4 essentially comprises a rest 49 and a plug element 19. The attachment device 4 is open toward a side surface 50 in the direction of an arrow x, and toward a top surface 51 in the direction of an arrow y. Furthermore, the attachment device 4 has side walls 52 which run approximately parallel to one another (only one side wall can be seen in the section view in which the attachment device 4 is illustrated) and which, in a plan seen in the direction of an arrow y', are spaced apart from one another by a distance which is greater than the width of the device holder 3. The plug element 19 forms a projection 53, which projects beyond the baseplate 21 of the rest 41 in the direction of the arrow y. The baseplate 21 has a through-hole 22, through which the attachment device 4 is screwed to the dashboard 54 of the vehicle 55. The plug element 19 is held in a recess 56 in the rest 49, preferably being latched in it. The plug element 19 has electrical lines 57 and a contact element 58. The electrical lines are connected to the contact element 58 and are routed out of the plug element 19 into the vehicle 55, toward a lower face 59, via a cable device 30 and an antenna cable 32. Contact is made with the plug elements 18, 19 and the device holder 3 is fixed to the attachment device 4 or to the vehicle 55 via a combined fitting and pushing-on movement. First of all, the device holder 3 is moved in the direction of the arrow y'. During this movement, the recess 47 in the device holder 3 engages over the plug element 19 and comes to rest between the side walls 52 of the attachment device 4. The plug element 19 is then held in the space 48 in the device holder 3. Subsequent movement in the direction of an arrow x' results in the plug element 18 of the device holder 3 being pushed onto the plug element 19. This leads to the plug elements 18, 19 making contact and to mechanical locking of the device holder 3 on the attachment device 4 by means of the plug elements 18, 19.

FIG. 2 shows a section through an attachment device 4 and a rest 49. The rest 49 comprises a baseplate 21, a cover 60 and a plug element 19. The baseplate 21 and the cover 60 are preferably in the form of two die-cast or injection-molded components, which are connected to one another by depressions 62 which interact with latching tabs 61 (see FIG. 3). The plug element 19 is arranged in an internal space 63 which is in the form of a tunnel and is surrounded by the cover 60 and the baseplate 21. In detail, the plug element 19 is composed of a contact element 58, electrical lines 57 and strain relief 64. The electrical lines 57 are formed into a bundle in the strain relief 64, can continue in the form of a multicore cable 30. The baseplate 21 is screwed to the dashboard 54 (shown as a detail) along axes 65, 66. The dashboard 54 has a through-hole 67 for the strain relief 64. Threads 68, 69 are provided in the dashboard 54, in order to hold the screws, which are not illustrated.

FIG. 3 shows a perspective view of the attachment device 4 shown in FIG. 2. The contact element 58 has eleven contacts 70 aligned in the direction of an arrow x. The cover 60 is in the form of a garage and is anchored in the baseplate 21 via feet 71. The dashboard 54, which is illustrated as a detail, is located underneath the baseplate 21. The attachment device 4 is assembled by inserting or threading the plug element 19 into the baseplate 21, with the cable 30 being drawn with the strain relief 64 through a recess 56 (see FIG. 2) in the baseplate 21. The plug element 19 is then fixed by snapping on the cover 60. In particular, the contact element 58 and the strain relief 64 are clamped in between the components 21, 60 in an interlocking manner. The baseplate 21 also has tabs 72, which form undercuts 73 which engage behind a correspondingly designed device holder, which is not illustrated. To this extent, the baseplate 21 is designed for latching of the device holder in a similar way to a pole shoe on a camera. One embodiment variant, which is not illustrated, provides the attachment device 4 to be in the form of an integral die-cast or injection-molded part with encapsulated electrical lines and encapsulated contact element.

FIG. 4 shows a perspective illustration of a further attachment device 4 in which a contact element 58 projects over a baseplate 21. The baseplate 21 has holes 74, 75 for attachment screws, which are not illustrated, to pass through. Guides 77 are formed on the side surfaces 76 of the baseplate 21, for a device holder that is not illustrated to engage behind.

FIG. 5 shows a perspective view of a further arrangement 1 according to the invention with a mobile telephone 2 associated with it. The arrangement 1 essentially comprises a device holder 3 and an attachment device 4. The mobile device 2 is intended to be inserted into a holder 5, in the form of a trough, in the device holder 3, where it is connected via a connecting plug 16 to electrical and electronic components which are arranged in the device holder 3. A projection 78 which is illustrated by dashed lines and is in the form of a plug element 18 is arranged on a bottom area 46 of the device holder 3. The plug element 18 essentially comprises a contact element 79 and electrical lines 80 which originate from it and lead to the electrical and electronic components which are arranged in the device holder 3. When the device holder 3 is connected, with or without a mobile telephone 2, the plug element 18 enters a recess 81 in the attachment element 4 in the direction of an arrow y'. Subsequent movement of the device holder 4 in the direction of an arrow x' results in contact being made between the plug element 18 and a plug element 19 which is arranged in the attachment device. A contact element 58 on the plug element 18 has contacts 82 in the form of sleeves, into which contacts 83 in the form of pins on the plug element 18 enter, forming an interlocking connection between the device holder 3 and the attachment device 4. The device holder 3 is removed from the attachment device 4, which is screwed to a dashboard (which is not illustrated) through holes 74, 75 by pulling back the device holder 3 in the direction of an arrow x, and then by lifting off the device holder 3 in the direction of an arrow y. According to one embodiment variant that is not illustrated, provision is made for the device holder to be pushed onto the attachment device obliquely, essentially in one direction. The plug elements are aligned appropriately for this purpose. A further embodiment variant provides a type of bayonet fitting between the device holder 3 and the attachment device 4. In this case, the device holder 3 and the attachment device 4 engage with one another by means of a fitting movement with a subsequent rotary movement, via tabs and grooves which are matched to one another. Sprung contact pins or contact balls which interact with contact surfaces are preferably provided for making contact between the plug elements.

FIG. 6 shows an arrangement 1 according to the invention for a mobile telephone 2 which is used in a motor vehicle. The arrangement 1 comprises a device holder 3 which is in the form of an accommodation housing or upper part and an attachment device 4, which forms a lower part. FIG. 6 shows these two components 3, 4 one above the other, not assembled, with the device holder 3 being shown in the form of side views which run in different planes. FIG. 7 shows an end view of the two components 3, 4 in the assembled state. FIG. 8 shows a plan view of the assembled arrangement 1, but without a mobile telephone.

As can be seen from FIGS. 6 and 8, the accommodation housing or the device holder 3 has an upper face in the form of a shell. The device holder 3 has a recess 5 in the form of a trough on its upper face, into which a mobile telephone can be inserted in a conventional manner. In the plan view shown in FIG. 8, the mobile telephone has been omitted, so that a plan view of the recess 5 in the form of a trough can be seen. Apart from this, the accommodation housing 3 is in the form of an elongated device holder 3 with longitudinal side walls 6, 7, with narrow end walls 8, 9 and with upper covering walls 10, 11, so that this results in an upper part 3 which is open at the bottom and has a lower opening 12 (see FIG. 6). An elongated first board 13 is inserted into this device holder 3, and is fit with electronic components which are used for specific matching of the respective mobile telephone 2 to be inserted to the functional facilities contained in the motor vehicle, such as a microphone, a loudspeaker, a power supply, emergency call functions, speech recognition, etc. In the specific exemplary embodiment, for matching to a specific mobile telephone, the board 13 is connected at one of its ends to a second board 14 which is aligned at right angles to it and itself has a system plug 15 which interacts with a connecting plug 16 on the mobile telephone 2. A first plug element 19, which is part of the attachment device 4, interacts with a second plug element 18, which is fit to the lower end of the board 14 and points in the longitudinal direction (arrow 17).

If the device holder 3 is in the form of a shell which is open at the bottom and has a U-shaped cross section, then the attachment device 4 is in the form of an appropriately matched housing which is open at the top and has a U-shaped cross section. In consequence, the attachment device 4 is formed from a planar baseplate 21 with a row of through-holes 22 for attaching the baseplate in the motor vehicle. Side walls 23, 24 and, in the exemplary embodiment, an end side wall 25 project at the sides of the baseplate 21. The attachment device 4 is open (opening 26) at the top so that the device holder 3 and the attachment device 4 can be joined together by their openings 12, 26. For this purpose, the device holder 3 has four laterally projecting connecting studs 27 with a rectangular cross section on its side walls 6, 7 which, when the device holder 3 and attachment device 4 are joined together, engage in a respective retaining groove 25, which is open at the top and is L-shaped, in the side walls 23, 24 of the attachment device 4, with an L-shaped movement. The movement during this engagement process is illustrated symbolically by arrows 29, with a vertical downward movement first of all, followed by a horizontal pushing or closing movement. The way in which the device holder 3 and the attachment device 4 are joined together via the connecting means 27, 28 is designed such that the plug elements 18, 19 are joined to one another or pulled apart from one another during the horizontal longitudinal movement (arrow 17). For this purpose, a plug housing 20 for the plug element 19 in the attachment device 4 is incorporated or clipped into the baseplate 21 in the region of the end wall 25, with cable connections 30 leading to the corresponding functional facilities in the motor vehicle. In order to make it simple to push the device holder 3 and the attachment device 4 together, the attachment device 4 is designed to be open on the face 31 opposite the end side wall 35, with the end side wall 8 of the device holder 3 which is pulled downward closing this area of the attachment device 4 once they are joined together. On the other side, the assembled arrangement is bounded by the end side wall 25, so that the upper side wall part 9 is designed to be short.

The illustration in the figures also shows an antenna cable 32 which leads from the connecting plug 16 via the system plug 15 and via a through-opening in the baseplate 21 to a connecting plug 33 for the antenna connection. This is a radio-frequency plug (RF plug). The plug elements 18, 19 are in the form of standardized, so-called D-sub plugs. The device holder 3 may also optionally have an additional function key 34, in order to activate additional functions, such as emergency call or the like. An additional RF plug 35 in the device holder 3 can be used for connection of the antenna plug of the mobile telephone 2. The device holder 3 can be screwed to the attachment device via an attachment screw 36. An additional ejection key 37 can be used for unlocking the mobile telephone 2, and thus for removing it from the device holder 3. The antenna of the mobile telephone 2 is provided with the reference symbol 38. As can be seen from the illustration in the figures (FIGS. 6 to 8), the attachment device 4 or the lower part is, in particular, in the form of an extremely simple part which can be used universally, with a standardized plug which, for example, can be installed in the motor vehicle at the factory, as a universal holder. The dimensions of the accommodation housing or of the device holder 3 are matched precisely to those of the lower part 4, so that an arrangement 1 which acts as a single part is produced when the two parts are joined together. In this case, all the specific characteristics of the mobile telephone 2 are taken into account by means of the board arrangement 13, 14, so that, depending on the type of mobile telephone 2, a device holder 3 is provided which is matched to it. If the two parts are clipped together via the closure with an L-shaped closing movement, then this results in a very simple manner and, above all, at an extremely low cost in an arrangement 1 for a mobile telephone 2, which arrangement 1 integrates this mobile telephone 2 in the motor vehicle.

FIG. 9 shows an arrangement 1, in the form of a perspective exploded illustration. A device holder 3 or an adapter for holding a mobile telephone 2 has a system plug 15 for holding a connecting plug 16 on the mobile telephone 2. The device holder 3 is intended to interact with an attachment device 4 which, in order to hold the device holder 3 mechanically, has a recess 39 in which a magnet 40 is arranged, which interacts with a magnetic component which is arranged on a lower face of the device holder. The adapter 3 and the attachment device 4 are connected at plug elements 18, 19 to plugs 42, 43 via a cable 41. The device holder 3 contains electronics which are matched to the mobile telephone 2 and make further mobile-telephone-specific electronic components in the vehicle or in the attachment device superfluous. Cables which are not shown run from the interface 19 through the attachment device 4 to electrical components that are installed in the vehicle, such as a loudspeaker and microphone.

FIG. 10 shows an arrangement 1 according to the invention and its inclusion in a vehicle, illustrated schematically. The arrangement 1 comprises a device holder 3 and an attachment device 4. A mobile telephone 2 is inserted into the device holder 3 and makes contact with a board 13 that is arranged in the device holder 3. The electrical board 13 includes, as electrical and electronic components 84, an audio amplifier 85 and a charging circuit 86. In addition, an antenna cable 88 is passed into the device holder 3 and is passed, for example, to a signal amplifier, which is not illustrated. An antenna cable 88, a power supply cable 89 (positive, ground, ignition), a microphone cable 90, a loudspeaker cable 91 and, optionally, a data line 92 and/or a serial or parallel control line are passed via an interface 87 to an interface 93 of the attachment device 4. The lines 88 to 92 are passed from the attachment device 4 to the corresponding functional devices 94. These are a vehicle antenna 95, a power supply 96 with a battery and ignition, a microphone 97, a loudspeaker 98 and a databus 99 for the vehicle. Furthermore, for example, a line which is not illustrated is passed from the device holder 3 via the attachment device 4 to an audio system for the vehicle, which transmits a muting switching signal (referred to as a mute signal) in order to mute the audio system in the hands-free mode. The data line 92 is passed via an interface 100 to the databus 99 for the vehicle (vehicle bus). When connected to the databus 99, the data line 92 makes it possible to provide what are referred to as extended convenience facilities which, for example, allow the mobile telephone to be operated via keys which are arranged on a steering wheel, or allow the display content of the mobile telephone to be displayed on the screen of a navigation system. From the point of view of the device holder, the vehicle bus is thus an electronic component for outputting and inputting data. The components which can be seen in the vehicle are annotated by a box 101 that is indicated by a dashed line.

FIG. 11 shows a perspective view of a further arrangement 1 according to the invention. The arrangement 1 comprises a device holder 3 which allows a mobile telephone 2 to be held in an interlocking manner, and an attachment device 4 which can be used to make mechanical and electrical contact with the device holder 3. The mobile telephone 2 is connected without the use of wires via an interface 102a to an interface 102b of the device holder 3, with the interfaces 102a, 102b being in the form of transmitting and/or receiving interfaces for infrared or electromagnetic waves, for example in accordance with the Bluetooth radio standard. The wirefree connection of the device holder 3 to the mobile telephone 2 allows the mobile telephone 2 to be taken out of the device holder 3 even during operation. The mobile telephone 2 is thus always connected to the device holder 3 and/or to an electronic circuit 13, which is arranged in the device holder 3, via a radio link 102. The intention is to interchange speech signals and data via the radio link 102. In addition, optional provision is made for a connecting plug 16 on the mobile telephone 2 to have mechanical contact made with it by a system plug 15 which is arranged in the device holder 3 but cannot be seen. The plugs 15, 16 form an interface 103 via which the intention is to transmit an antenna signal and/or a power supply. If the user does not need to transmit the antenna signal or a power supply, it is also possible to place the mobile telephone at any desired location in the vehicle and nevertheless to use all the convenience facilities and extended convenience facilities, such as the hands-free facility and the ability to control the mobile telephone via keys on the steering wheel, with this being available by means of the electronic circuit 13 in the device holder 3. According to an embodiment variant which is not illustrated, provision is also made for more than one mobile telephone 2 to be operated via the device holder 3. Parallel operation of mobile telephones is then also possible, with an appropriate configuration of the electronic circuit 13. This is done by driving specific microphones and loudspeakers by and/or via the electronic circuit 13 for each user.

FIG. 12 shows a plan view of a further arrangement 1 with a device holder 3 which is connected to an attachment device 4, which is concealed by the device holder 3 in FIG. 12. The device holder 3 has an accommodation area 5 for a mobile telephone that is not illustrated but in which contact can be made with the mobile telephone by means of a connecting plug 15. The accommodation area 5 also contains an antenna plug 104 which can be used to make contact with an antenna connection of the mobile telephone, which is not illustrated. The mobile telephone, which is not illustrated, is mechanically fixed in the inserted state via tabs 105 which are controlled by a slide 106.

FIG. 13 shows a section through the arrangement 1, as illustrated in FIG. 12 along the section line XIII-XIII. The section view shows a main board 13 and a further board 14, which is arranged at right angles to it, in the device holder 3, with the system plug 15 being arranged on the further board 14 in order to make contact with the mobile telephone. Opposite the second board 14, the main board 13 has a further system plug 18, which is connected to a plug element 19 (not shown completely here, see the plug element 19 in particular in FIGS. 17 and 19). The plug element 19 is held in the attachment device 4. The attachment device 4 is essentially formed from four parts, and comprises the plug element 19, a rest body 107, a baseplate 108 and a flange 109. The device holder 3 is essentially formed from two parts, and comprises an upper half shell 110 and a lower half shell 111. In the area of the lower half shell 111, the device holder 3 has a recess 47, into which the attachment device 4 and/or a head area 112 of the rest body 107 project in the coupled state. The device holder 3 and the attachment device 4 rest on one another in a contact area 113 in the coupled state.

FIG. 14 shows a section through the arrangement 1, as illustrated in FIG. 12, along the section line XIV-XIV. The section XIV-XIV through the device holder 3 and through the attachment device 4 runs in the area of the antenna plug 104 and of a latching mechanism 114. The latching mechanism 114 locks the device holder 3 and the attachment device 4 to one another in the mated state, as shown in FIG. 14, in order to prevent the device holder 3 from becoming inadvertently detached from the attachment device 4. The latching mechanism 114 comprises a pin 115 which is guided in the upper half shell 110 and in the lower half shell 111 of the device holder 3. The pin 115 has a collar 116. A spiral spring 118 is arranged between the collar 116 and a hollow cylinder 117 (which is connected to the lower half shell 111) and pushes the pin 115 in the direction of an arrow y toward an opening 119 in the upper half shell 110. The opening 119 opens into the accommodation area 5 for the mobile telephone and is covered with a flexible cap 120, in order to prevent the ingress of dust and dirt into a hollow cylinder 121 in which the pin 115 is guided in the upper half shell 110. This hollow cylinder 121 is also used to limit the movement of the pin 115 in the direction of the arrow y. A pin 122 is likewise arranged in the attachment device 4. This has a collar 123 and a tab 124. The pin 122 is guided in a recess 125 in the rest body 107 and is supported against the baseplate 108 via a spiral spring 126 which is mounted in a hole 127 in the pin 122. Any lifting movement of the pin 122 in the direction of the arrow y' is limited by the collar 123 striking the rest body 107. When the device holder 3 is latched to the attachment device 4 as shown in FIG. 14, the tab 124 on the pin 122 projects into the hollow cylinder 117 which is arranged in the lower half shell 111 and, together with an interlocking connection 128 that is formed between the device holder 3 and the attachment device 4, prevents any movement of the device holder 3 relative to the attachment device 0.4 in the direction x or x'. The latching mechanism 114 is detached by manually pushing down the flexible cap 120 in the direction of the arrow y' from a position A to a position B through a distance h. This results in the tab 124 on the pin 122 being pushed by the pin 115 out of the hollow cylinder 117 on the device holder 3, so that this tab 124 can be withdrawn from the attachment device 4, out of the plane of the drawing, in the direction of the arrow x. As soon as the pin 122 is no longer positioned centrally with respect to the hollow cylinder 117, the pressure on the flexible cap 120 and hence on the pin 115 can be removed. When the device holder 3 is being pushed onto the attachment device 4, the tab 124 on the pin 122 is moved to a pushed-down position by the rounded housing of the device holder 3, from which position the pin 122 then snaps into the hollow cylinder 117. The interlocking connection 128 between the device holder 3 and the attachment device 4 is provided by U guides 129, which run parallel to one another and open in opposite directions z, z', and webs 130 which run in them. The webs 130 can be moved out of the plane of the drawing from the position shown in FIG. 14 in the direction of the arrow x in the U guides 129. Considered from the direction of the arrow y', the webs 130 which are arranged on the lower half shell 111 of the device holder 3 clasp the attachment device 4 and/or the rest body 107, thus holding it partially in the recess 47. This results in the mechanical and electrical contact between the device holder 3 and the attachment device 4 being produced within or inside the device holder 3, specifically in the recess 47.

FIG. 15 shows a perspective view from underneath of the device holder 3 as illustrated in FIGS. 12 to 14. The recess 47 is in the form of a contact and holding area 132 which is closed on five sides but is open toward a lower face 131 of the device holder 3. The mutually opposite webs. 130 have interruptions 133, between which the U guides 129, which are not shown in FIG. 15, of the attachment device 4 can move. The plug element 18 on the device holder 3 is arranged approximately at right angles to the lower face 131 in the recess 47.

FIG. 16 shows a view of the device holder 3 from a direction slightly rotated from that in FIG. 15. This view makes it possible to see the plug element 18, although this is illustrated only in simplified form. The perspective views from underneath in FIGS. 15 and 16 show the smooth shape of the device holder 3, which has no disturbing projections or edges even in the region of the contact and holding area 132 and is thus also excellently suited for being transported, for example, from vehicle to vehicle with the mobile telephone inserted in it without the device holder 3 being jammed in a pocket of a jacket or pants, or damaging items of clothing. This characteristic of the device holder 3 is particularly important with regard to the capability to use the device holder universally since, with availability such as this, the attachment device will regularly be transported, for example, from a private vehicle to a company vehicle, or to a secondary vehicle. Furthermore, the invention also provides for the arrangement according to the invention, in particular the attachment device, to be made available to anyone in the domestic area, in the office area, or in public buildings and vehicles.

FIG. 17 shows a side view of the attachment device 4 as illustrated in FIGS. 12, 13 and 14, in the form of an exploded illustration from the side. This view shows the multipart construction of the attachment device once again, in detail. In addition to the plug element 19, the attachment device 4 comprises the rest body 107, the baseplate 108 and the flange 109. The plug element 19 has a contact element 58, via which the electrical contact is made with the system plug 18 on the device holder 3 (see FIG. 12). The contact element 58 has a contact area 134 and a holding area 135 with tabs 136 which merge into a cable 137. The cable 137 is extrusion-coating with a holding element 138 with opposite grooves 139. When the attachment device 3 is in the assembled state, the holding area 135 of the contact element 58 is held in an interlocking manner in the head area 112 of the rest body 107. This results in the contact area 134 and its individual contacts, which are not shown, being fixed in a defined position. The plug element 19 is further fixed via the holding element 138 in the baseplate 108, which engages in the grooves 139 in an interlocking manner. Once the plug element 19 has been passed through apertures 140, 141 in the rest 107 and in the baseplate 108 and has been fixed thereto, the rest 107 and the baseplate 108 are plugged and screwed together. The screws 142, which are illustrated in simplified form, are used for screwing them together. Furthermore, prior to this, the pin 122 and the spiral spring 126 will also have been moved into position between the rest 107 and the baseplate 108. The flange 109 likewise has an aperture 143, through which the cable 137 is passed when the attachment device 4 is in the assembled state. An upper shell 144, which is formed essentially from the plug element 19, the rest 107, the baseplate 108, the pin 122 and the spiral spring 126, is fixed on a lower shell 145, which is formed essentially by the flange 109, by means of latching arms 146 which are arranged on the baseplate 108. The latching arms 146 are hooked into depressions, which cannot be seen, in the flange 109, which is fixed to the vehicle, for example, by means of screws or a further latching connection.

FIG. 18 shows the exploded view of the attachment device 4 as illustrated in FIG. 17 viewed from a direction rotated through 90°. The U guides 129 which are formed on the head area 112 of the rest 107 can clearly be seen in this view.

FIG. 19 shows a perspective view of the exploded illustrations of the attachment device 4 as shown in FIGS. 17 and 18. The U guides 129 which are formed on the rest 107 have interruptions 147. The interruptions 147 have a length l which allows the first webs 130a of the device holder 4 to pass through (see also FIG. 15). The first webs 130a have a length k. The ratio of the lengths is given by k<l. The device holder 3 is thus initially mounted on the attachment device 4 by moving the device holder 3 in the direction of the arrow y' onto the attachment plate 4. During this movement in the direction of the arrow y', the first, opposite webs 130a pass through the opposite interruptions 147 in the U guides 129 of the attachment device 4 until they rest on cap surfaces 148 of the attachment device 4. The second, opposite webs 130b on the device holder 3 also rest in places in an edge area 149 on the cap surfaces 148 of the attachment device 4 once the position has been reached. Once the device holder 3 has reached this position, in which it is aligned with the attachment device 4, the device holder 3 is moved in the direction of the arrow x', with the webs 130, or 130a and 130b, moving into the U guides 129 on the attachment device 4. At the same time as this insertion movement, or even after only a section of the insertion movement, the contact area 134 on the plug element 19 meets the plug element 18 which is arranged on the device holder, and they are then pushed one inside the other. The arrangement of the plug elements 18, 19, set back in the direction x or x', respectively, with respect to the respective U guides 129 and webs 130 allows the interaction of the U guides 129 with the webs 130 first of all to center the device holder 3 on the attachment device 4 by means of the mechanical contact-making elements, specifically the U guides 129 and the webs 130. This protects the electrical contact-making elements, the plug elements 18, 19, since they do not need to absorb any centering loads. The insertion movement in the direction of the arrow x' ends with a side surface 150 of the recess 47 (see FIG. 15) meeting a front surface 151 of the rest body 107, or with the contact-making elements being completely pushed together. Once the device holder 3 reaches this position in which it is completely coupled to the attachment device 4, the tab 124 on the pin 122 which is arranged in the attachment device 4 projects into the hollow cylinder 117 of the device holder 3 (see FIG. 14). This lock leads to the device holder 3 being fixed securely on the attachment device 4 since this prevents the device holder 3 from being pulled off in the direction of the arrow x. Any movement of the device holder 3 relative to the attachment device 4 in the directions x, y, y', z, z' is prevented by the mechanical interaction of the two components 3, 4. The two components 3, 4 cannot be separated until the latching connection that is produced by the pin 122 has been released. The device holder 3 is removed from the attachment device 4 by an L-shaped movement in the directions x and y.

In order to make it easier to insert the plug element 19 into the rest body 107, the latter has a slot 153 (through which the cable 0.137 can be pushed into the rest body 107) in a cap area 152. There is thus no need to thread the plug element 19 through for the rest body 107. When the attachment device 4 is in the assembled state, the slot 153 is concealed by a panel 154 which is arranged on the baseplate 108 and is arranged on a cap 155 which has a depression 156. A tab 136, which cannot be seen in FIG. 19, on the holding area 135 of the plug element 19 engages in this depression 156 when the attachment device 4 is in the assembled state, and ensures that the holding area 135 and the contact area 134 are fixed between the rest body 107 and the baseplate 108. Further tabs 136 engage in depressions, which cannot be seen, in the rest body 107. The flange 109 has two through-holes 157 at the side of the aperture 143 for the cable 137 of the plug element 19 to pass through, and these two through-holes 157 are provided for screws, which are not illustrated, to pass through, in order to fix the flange 109 to the vehicle.

FIG. 20 shows a perspective view of one embodiment variant of an attachment device 4. This essentially comprises a plug element 19, a rest body 107, a flange 109 and a baseplate 108. In this variant, the rest body 107 and the baseplate 108, which hold the plug element 19, are connected to the flange 109 such that they can rotate (see in particular FIG. 26, as well). The baseplate 108 is screwed to the rest body 107 by means of screws which cannot be seen. Furthermore, a hollow-cylindrical projection 158 on the baseplate 108 passes through an aperture 143 (with an annular cross section) in the flange 109. An annular bead 159 which is arranged on the projection 158 engages over a bottom surface 160 of the flange 109, and thus ensures that the flange 109 and the other components of the attachment device 4 are connected such that they can rotate about an axis d. This connection is formed in a similar way to a ring mount. Cables 137 which are part of the plug element 19 are passed through the hollow-cylindrical projection 158 into the vehicle and to electrical and electronic components in the vehicle.

FIG. 21 shows a further perspective view of the attachment device 4 as illustrated in FIG. 20. This view shows that the attachment device 4 is constructed analogously to the attachment device described in FIGS. 12 to 19 with regard to the interaction with a device holder that is not illustrated. The attachment device 4 likewise has a pin 122 for latching to the device holder.

FIG. 22 shows a perspective view of the attachment device 4, as illustrated in FIGS. 20 and 21, in a position in which it is rotated through about 90° to the left. FIG. 23 shows a plan view of the attachment device 4 as illustrated in FIG. 22.

FIG. 24 shows a view from underneath of the attachment device 4 as illustrated in FIG. 20. This view shows through-holes 157 which are arranged on the flange 109 and by means of which the flange 109 can be attached to the vehicle by means of screws which are not shown. The rotation axis d is defined by the hollow-cylindrical projection 158, which is used as a rotation and connection means.

FIG. 25 shows a plan view of the attachment device 4 as illustrated in FIG. 20. FIG. 26 shows a section through the attachment device 4 as illustrated in FIG. 25, along the section line XXVI-XXVI. This section view shows latching bodies 161 which are arranged between the rest body 107 and the baseplate 108.

Hemispherical heads 162 on the latching bodies 161 engage in through-holes 163 which are arranged in the flange 179. This provides mechanical fixing for the rest body 107 and for all the components which are firmly connected to it with respect to the flange 109 when the attachment device 4 is in the basic position as shown in FIG. 26. The arrangement of further holes in the flange 109 allows the attachment device 4 to be latched in other positions (for example in the position shown in FIGS. 22 and 23). Dashed lines in FIG. 24 indicate the position of two further holes 164. These would be required in order to latch the rest body 107 and all the components which are firmly connected to it in the position as shown in FIGS. 22 and 23. One embodiment variant, which is not illustrated, provides for further through-holes or indentations to be arranged in the flange, and these are arranged on a concentric circle 165, as indicated by dashed lines, around the rotation axis d. An attachment device which can rotate is particularly advantageous when the user requires the mobile telephone to be in different positions. A further embodiment variant provides a ball joint connection between the flange and the rest body, so that this can be pivoted or rotated in all spatial directions with respect to the flange, together with the plug element. A further exemplary embodiment, which is not illustrated, provides for the flange to be arranged such that it can be moved in a straight and/or curved rail. This is also intended to allow the individual cores of the cable to make contact via sliding contacts with contact surfaces which are arranged on the rail. An attachment device such as this allows freedom of movement along the profile of the rail.

FIG. 27 shows a schematic, simplified side view of one embodiment variant of an arrangement 1 according to the invention. This comprises an attachment device 4 and an integration unit 3a. The attachment device 4 is firmly connected to the dashboard 54 of a vehicle 55. In addition to the electronic components which are required for operating and controlling a convenience facility, the integration device 3a contains a transmitting and receiving module 166, which is designed to communicate with a mobile telephone 2 without the use of wires. The mobile telephone 2 likewise has a corresponding transmitting and receiving module 167. The transmitting and receiving modules 166 and 167 transmit to one another at least all the data that is required for operation of the convenience facility, for example the hands-free function, via a loudspeaker that is installed in the vehicle and via a microphone that is installed in the vehicle. In this case, the invention also provides for the arrangement 1 to be used by a second mobile telephone 168, which likewise has a transmitting and receiving module 169. Provision is, of course, also made for the arrangement 1 to be used with more than two mobile telephones or communication devices. The integration unit 3a is designed in the form of a covering cap 170, which covers the attachment device 4 with a recess 47. Alternatively, a covering cap which does not contain any electronics is also provided, in order to protect the attachment device when it is not being used and to provide for it to be integrated in the vehicle by virtue of its shape. This integration by virtue of its shape is, of course, also provided when the integration unit is used. Its surface and shape are then matched to shaped elements in the vehicle, or are designed as a visual eye catching feature.

FIG. 28 shows a further attachment device 4, which is essentially constructed in a corresponding manner to the attachment device as illustrated in FIGS. 20 to 26. On side surfaces 171, 172 of a flange 109, the attachment device 4 has indicating means 173, which are in the form of elongated light-emitting diodes 174, 175, and optical conductors 176. A further indicating means, which is in the form of an arrow 178, is illustrated on an upper face 177 of a rest body 107 for the attachment device 4. The arrow 178 indicates to the user the point at which the device holder and/or the integration unit (not shown here) must be connected to the attachment device 4. Furthermore, provision is also made for the indicating means 173 to be formed by holes 179, which are incorporated in the attachment device 4, and by at least one light source (which cannot be seen here) arranged behind them.

FIG. 29 shows a further attachment device 4, which is constructed in an essentially corresponding manner to the attachment device as illustrated in FIGS. 20 to 26. The attachment device 4 has push button switches 180-183 on a side surface 171 of a flange 109, and these push button switches 180-183 are intended for operation of special facilities, such as emergency call, breakdown call or vehicle locking. A supplementary or alternative embodiment variant is shown on one side surface 172 of the flange 109. Touch-sensitive switches (sensors) 184, 185 are arranged here, via which special facilities can be used. According to one embodiment variant, which is not illustrated, provision is also made for push button switches or sensors and indicating means to be arranged on the attachment device. Additionally or alternatively, a further embodiment variant provides for indicating means and/or switches to be arranged on the device holder and/or on the integration unit.

The arrangement 1 according to the invention as illustrated in FIGS. 30 to 32 has, as a holder for a handheld radio telephone 2 in a vehicle, a hand shell 3 as well as a plug element 4 which can be latched into a coupling part 47 on the rear face 46 of the hand shell 3.

The plug element 4 has two cables 30 and 32 (antenna signal, power supply, audio frequency for loudspeakers/microphones, data interface), which can be connected as directly as possible via appropriate plugs to standardized interfaces in the vehicle. The plug element 4 is, for example, arranged as a "plug console" on the internal lining of a vehicle, and is thus used for holding the hand shell 3 which is plugged to it and/or latched in. All the electronics (hands-free facility, hands-free listening, serial interface, . . . ) are accommodated on a board in the hand shell 3. Although the hand shell 3 provides the signals for hands-free listening and speaking, it does not itself have a microphone or loudspeaker. The handheld radio telephone 2 is held in the hand shell 3 by two holding jaws 186 which can be moved at right angles to a hand shell longitudinal axis 1. On their inside, the jaws 186 have studs (which cannot be seen), which engage in recesses on the longitudinal faces of the handheld radio telephone 2. The hand shell 3 has a recessed accommodation area 5, which is open at the top but is closed at the sides and at the bottom for the handheld radio telephone 2. In a plan view (FIG. 30), the hand shell 2 has an approximately oval contour. Handheld radio telephones are generally provided with a contour like roof tiles. Electrical contacts (which cannot be seen) are arranged on the straight lower end face of the handheld radio telephone 2. Matching these contacts, the hand shell 3 likewise has electrical contacts (which cannot be seen) in a lower boundary wall of the accommodation area 5. A rounded appendage or projection 187 extends adjacent to and aligned with these contacts, and is closed by a removable cover 188. Since the cover 188 can be removed, this on the one hand allows different contact arrangements to be used, and also allows different wiring systems, appropriate for them, to be implemented. Replaceable electronic circuits or matching circuits can also be provided under the cover 188. The accommodation area 5 in the hand shell 3 is formed such that the handheld radio 2 projects upward beyond its edge 189. The arrangement 1 according to the invention is designed such that the handheld radio telephone 0.2 can be inserted into the hand shell 3, with conductive electrical connections being made, and such that the hand shell 3 can likewise be plugged to the plug element 4, with conductive electrical connections being made.

FIG. 33 shows an arrangement 1 which comprises a device holder 3 and an attachment device 4 which matches the device holder 3. The device holder 3 is illustrated in the form of a perspective view of a lower face 131 and, by analogy with the device holder as illustrated in FIGS. 15 and 16, has a contact and holding area 132, which is in the form of a recess 47. The contact and holding area 132 has a bottom surface 190 with six contact surfaces 191, which together form an interface 18 for the attachment device 4. Depressions 194, 195 are formed on opposite side walls 192, 193 of the contact and holding area 132. The attachment device 4, which is illustrated enlarged in comparison to the device holder 3, has a rest body 107 on whose upper face 177 contact pins 196 (in this case only three contact pins are illustrated by way of example) are arranged, sprung in the direction of the arrow y'. Furthermore, the rest body 107 has projections 199, 200 on opposite side surfaces 197, 198. When the device holder 3 has been placed on the attachment device 4, the contact surfaces 191 meet the contact pins 196 and push them slightly in the direction of the arrow y' into the rest body 107, in order to make a secure contact. In this position, the projections 199, 200 are snapped into the depressions 194, 195 and hold the attachment device 4 and the device holder 3 in an interlocking manner in the coupled position. The interlock between the attachment device 4 and the device holder 3 can easily be released by raising the device holder 3 at one free end 201, owing to the rounded edges and shallow depths of the projections and depressions.

FIG. 34 shows one embodiment variant of the arrangement as illustrated in FIG. 33. On a lower face 131, a device holder 3 has a contact and holding area 132, which is arranged in a central area 202 symmetrically on the lower face 131 of the device holder 3. Contact surfaces 191 are arranged on opposite side walls 192, 193 in the contact and holding area 132. These form an interface 18 to contacts 196 which are arranged on opposite side surfaces 197, 198 of a rest body 107 of an attachment device 4. The attachment device 4 is, of course, attached to a vehicle via attachment means which are not shown. The contacts 196 project like gables beyond the side surfaces 197, 198 in the directions of the arrows z and z', respectively. When the device holder 3 is placed on the attachment device 4, the geometry of the contact and holding area 132, which is matched to the rest body 107, results in the contacts 196 being pushed into the rest body 107 against spring forces. The contacts 196 are stressed when the device holder 3 is in place, and produce a friction lock, which holds the device holder 3 on the attachment device 4. One embodiment variant, which is not illustrated, provides for the contacts 196 to latch into notches which are arranged on the contacts 191, and in this way to produce an interlock. The holding forces which are produced by the friction lock or the interlock are designed such that the device holder 3 can be removed by a slightly increased lifting force acting in the direction of the arrow y.

FIG. 35 shows a further embodiment variant of the arrangement as illustrated in FIG. 33. A device holder 3 has a cylindrical contact and holding area 132 on one lower face 131. Three annular or circular contact surfaces 191, which are concentric with respect to a center axis m of the cylindrical contact and holding area 132, are arranged on a bottom surface 190 in the contact and holding area 132. These contact surfaces 191 form an interface 18 to contact pins 196 (illustrated in simplified form) which are seated on an upper face 177 of a cylindrical rest body 107 of an attachment device 4. On one side surface 197, the cylindrical rest body 107 has a latching ball 203 which is mounted in a sprung manner. When the device holder 3 and the attachment device 4 are in the assembled state, the sprung contact pins 196 make contact with the contact surfaces 191. Furthermore, the latching balls 203 latch into one of the depressions 194 which are arranged on one side wall 192 of the contact and holding area 132. This results in the device holder 3 being fixed in an interlocking manner on the attachment device 4. Rotation of the device holder 3 about the axis m allows the latching ball 203 to be released from one of the depressions 19.4, and to latch into one of the adjacent depressions 194. This allows the angle at which the device holder 3 is located with respect to the attachment device 4 to be adjusted in steps. The device holder 3 is lifted off the attachment device 4 by slightly rotating the device holder 3 about the axis m (releasing the latching ball 203 from the depression 194), and then lifting the device holder 3 off the attachment device 4. According to an embodiment variant which is not illustrated, provision is also made for continuously variable angular adjustment of the device holder 3 with respect to the attachment device 4. An annular open channel which runs parallel to the bottom surface 190 is provided on the side wall 192 for this purpose, in which open channel the latching ball 203 slides. Two or more latching balls 203 may, of course, also be arranged on the attachment device 4, in order to distribute the forces to be absorbed.

FIG. 36 shows a device holder 3. This has an accommodation area 5 for a mobile telephone, which is not illustrated, and has a contact and holding area 132 on one longitudinal face 6. The contact and holding area 132 has a cuboid shape and, on one side wall 192, has contact surfaces 191, which form an interface 18 to an attachment device, which is not shown.

FIG. 37 shows a device holder 3 from FIG. 36 in a position in which it has been placed on an associated attachment device 4. The attachment device 4 is mounted on a dashboard 54, and a mobile telephone 2 is inserted in the device holder 3. The arrangement 1 formed in this way is used in particular for holding a mobile telephone configured in the "transverse former".

The arrangement is not restricted to the illustrated and described exemplary embodiment. It also covers all refinements by those skilled in the art in the context of the patent claims. The title of the expression mobile telephone should in each case be understood as being representative of all communication means.

List of Reference Symbols:
1 Arrangement
2 Mobile telephone
3 Device holder/upper part/hand shell
3a Integration unit
4 Attachment device/lower part/plug element
5 Recess in the form of a trough/accommodation area
6 Longitudinal side wall
7 Longitudinal side wall
8 End wall 9 End wall
10 Upper covering wall
11 Upper covering wall
12 Opening
13 Board/main board
14 Board
15 System plug for 3 and/or 14
16 Connecting plug for 2
17 Arrow/longitudinal direction
18 First plug element/system plug for 3 and/or 14
19 Second plug element for 4
20 Plug housing
21 Baseplate for 4
22 Through-hole in 21
23 Side wall
24 Side wall
25 End side wall
26 Opening
27 Connecting stud
28 L-shaped retaining groove
29 Arrow
30 Cable device
31 Opposite face
32 Antenna cable
33 Connecting plug
34 Function key
35 RF key
36 Attachment screw
37 Ejection key
38 Antenna of the mobile telephone
39 Recess
40 Magnet
41 Cable
42 Plug for 41
43 Plug for 41
44 Usage unit
45 Interior of 3
46 Bottom area of 3/rear face of 3
47 Recess in 3 or 3a/coupling part
48 Space
49 Rest
50 Side surface of 4
51 Top surface of 4
52 Side wall of 4
53 Projection
54 Dashboard
55 Vehicle
56 Recess in 49
57 Electrical line of 19
58 Contact element of 19
59 Lower face of 19
60 Cover
61 Latching tab
62 Depression
63 Interior of 19
64 Strain relief
65 Axis
66 Axis
67 Through-hole
68 Thread in 54
69 Thread in 54
70 Contact
71 Foot
72 Tab
73 Undercut
74 Hole
75 Hole
76 Side surface of 21
77 Guide
78 Projection from 3
79 Contact element of 18
80 Electrical line
81 Recess in 4
82 Contact in the form of a sleeve
83 Contact in the form of a pin
84 Component
85 Audio amplifier
86 Charging circuit
87 Interface for 3
88 Antenna cable
89 Power supply cable
90 Microphone cable
91 Loudspeaker cable
92 Data line
93 Interface for 4
94 Function device
95 Vehicle antenna
96 Power supply
97 Microphone
98 Loudspeaker
99 Databus
100 Interface
101 Box
102 Radio link between 2 and 3 or 3a
102a Interface
102b Interface
103 Interface from 15, 16
104 Antenna plug in 3
105 Tab
106 Slide
107 Rest body for 4
108 Bottom panel of 4
109 Flange of 4
110 Upper half shell of 3
111 Lower half shell of 3
112 Head area of 107
113 Contact area
114 Latching mechanism
115 Pin in 3
116 Collar on 115
117 Hollow cylinder in 3
118 Spiral spring in 3
119 Opening in 3
120 Flexible cap on 3
121 Hollow cylinder in 3
122 Pin in 4
123 Collar on 122
124 Tab from 122
125 Recess in 107
126 Spiral spring in 4
127 Hole in 122
128 Interlocking connection between 3 and 4
129 U guide on 4 or 107
130 Web on 3 or 111
130a First web
130b Second web
131 Lower face on 3
132 Contact and holding area on 3
133 Interruption in 130
134 Contact area
135 Holding area
136 Tab
137 Cable
138 Holding element 139 Groove
140 Aperture in 107
141 Aperture in 108
142 Screw
143 Aperture in 109
144 Upper shell
145 Lower shell
146 Latching arm
147 Interruption
148 Cap surface
149 Edge area
150 Side surface of 47
151 Front surface of 107
152 Cap area of 107
153 Slot in 107 or 152
154 Panel on 108
155 Cap on 108
156 Depression in 155
157 Through-hole in 109
158 Hollow-cylindrical projection from 108
159 Bead in the form of a ring from 158
160 Bottom surface of 109
161 Latching body in 4
162 Hemispherical head of 161
163 Through-hole in 109
164 Through-hole in 109
165 Circle around d
166 Transmitting and receiving module in 3a
167 Transmitting and receiving module in 2
168 Second mobile telephone
169 Transmitting and receiving module in 168
170 Covering cap
171 Side surface of 109
172 Side surface of 109
173 Indicating means
174 Light-emitting diode
175 Light-emitting diode
176 Optical conductor
177 Upper face of 107
178 Arrow
179 Hole
180-183 Push button switches
184, 185 Touch-sensitive shell/sensor
186 Holding jaw on 3
187 Appendix/projection
188 Cover for 187
189 Edge of 3
190 Bottom surface of 132
191 Contact surface on 3
192, 193 Side wall of 132
194, 195 Depression in 192, 193
196 Contact pin
197, 198 Side surface of 107
199, 200 Projection on 197, 198
201 Free end of 3
202 Center area of 3
203 Latching ball on 4

The invention claimed is:

1. An arrangement for handling a communication device for use in a vehicle, comprising,
a device holder which holds the communication device, the device holder having an upper accommodation area comprising a shell and being geometrically and mechanically matched to a shape of the communication device and being connected to it for communication,
an attachment device adapted to be fixed to the vehicle for removably mounting the device holder to the vehicle, wherein the attachment device is free of any circuit boards and is mechanically matched to the device holder and provides a direct mechanical and electrical connection to the device holder,
an electronic circuit board within the device holder and comprising electronic components required for operation and/or control of a convenience device,
wherein universal, mechanical standardization or matching is provided for connection of the device holder to the attachment device, and universal electrical standardization and matching of the device holder to the attachment device are provided in addition to mechanical standardization and matching, and further including only electrical and/or electronic components for inputting and/or outputting speech and/or data following the attachment device.

2. The arrangement as claimed in claim 1, further including a wireless communication connection between the communication device and the device holder.

3. The arrangement as claimed in claim 1, further comprising different device holders and identical attachment devices for different communication devices.

4. The arrangement as claimed in claim 1, wherein the attachment device has a volume approximately ⅛ to ⅓ of the device holder volume.

5. The arrangement as claimed in claim 1, wherein the electronic circuit board in the device holder performs matching, which is specific for the communication device, to the electrical and/or electronic components which are contained in the motor vehicle, including a microphone, a loudspeaker, a power supply and a databus.

6. The arrangement as claimed in claim 1, wherein the electronic circuit board in the device holder for the communication device has an associated plug element for connection to a connecting plug of the communication device.

7. The arrangement as claimed in claim 6, wherein the plug element which is associated with the electronic circuit board, for connection to the communication device is arranged on a further electronic circuit board, which is connected to the first board.

8. The arrangement as claimed in claim 7, wherein the further electronic circuit board is connected to the first board at right angles.

9. The arrangement as claimed in claim 1, wherein the device holder has a connecting plug for an antenna connection for the communication device.

10. The arrangement as claimed in claim 9, further comprising a separate cable leads via the device holder and via the attachment device to the motor vehicle or to the antenna connection.

11. The arrangement as claimed in claim 1, wherein the device holder has a charger for an energy source for the communication device.

12. The arrangement as claimed in claim 1, wherein the vehicle contains a loudspeaker, a microphone, an antenna and a power supply and the device contains electrical and electronic components operably linked to the loudspeaker, microphone, antenna and a power supply.

13. The apparatus as claimed in claim 1, wherein the device holder holds the communication device in an interlocking and/or force-fitting manner.

14. The apparatus as claimed in claim 1, wherein the device holder has a plug element for a power supply and/or an antenna connection.

15. The apparatus as claimed in claim 1, further comprising at least one moving clamping jaw located on the device holder for holding the communication device.

16. The arrangement as claimed in claim 1, further comprising a plug element which attaches in a fixed position to a wall, in particular to the inner lining of a vehicle interior, with the plug element and the shell rear face having mutually matching coupling parts for detachable mechanical and electrical connection, and the shell being designed such that, when the communication device is inserted, its contour is not exceeded in the area above the center of the communication device, and is exceeded only insignificantly in the lower area at the side, and the shell contour is lengthened by a projection which forms the lower shell area, as a result of which the shell has a slim shape, which can be gripped well, and for the communication device to be removed from it.

17. The arrangement as claimed in claim 1, wherein the shell has an accommodation area for the communication device, whose edge is designed to be only sufficiently high that it always remains under the upper face of the communication device when the latter is inserted.

18. The arrangement as claimed in claim 1, wherein one of the coupling parts is arranged in the upper area of the rear face of the shell for the plug element, and the contour of the plug element does not extend beyond the contour of the shell when the latter is latched in.

19. The arrangement as claimed in claim 1, wherein an upper face of an appendix has a cover which can be removed during installation in order, when the cover is removed, a plug and an electronic circuit can be matched for a predetermined communication device.

20. An arrangement for handling a communication device for use in a vehicle comprising,
an integration unit connected to the communication device, the integration unit having a geometric and mechanical match to the communication device and being connected to it for communication,
an attachment device adapted to be fixed to the vehicle for removably mounting the integration unit, wherein the attachment device is free of any circuit boards and is mechanically matched to the integration unit and provides a direct mechanical and electrical connection to the integration unit,
an electronic circuit within the integration unit and comprising at least all the electronic components required for operation and/or control of a hands-free device or convenience device,
wherein universal, mechanical standardization and/or matching is provided for connection of the integration unit to the attachment device, and universal electrical standardization and matching of the integration unit to the attachment device are provided in addition to the mechanical standardization and matching, and further including only electrical and/or electronic components for inputting and/or outputting speech and/or data following the attachment device; and a wireless communication connection between the communication device and the integration unit.

21. The arrangement as claimed in claim 20, wherein the convenience device is a hands-free device and/or telematics application.

22. The arrangement as claimed in claim 20, wherein the attachment device has a rest with a first plug element, with the first plug element interacting with a second plug element which is arranged on the device holder or on the integration unit, and with the attachment device comprising a universal, standardized, mechanical rest for holding the device holder or the integration unit, and of a universal, standardized plug element for making contact with the plug element of the device holder or the integration unit.

23. The arrangement as claimed in claim 22, wherein the first plug element has lines through which antenna signals, a supply current, microphone signals and loudspeaker signals pass.

24. The arrangement as claimed in claim 22, wherein the first plug element has lines through which serial or parallel control signals pass.

25. The arrangement as claimed in claim 24, wherein the lines interconnect the attachment device and a bus system in the vehicle to allow communication between the communication device and the databus to functionally integrate the communication device with the vehicle.

26. The arrangement as claimed in claim 20, wherein the attachment device is connected firmly by a screw connection and/or adhesive bonding and/or latching to a dashboard, a center console or a roof area of the vehicle.

27. The arrangement as claimed in claim 20, wherein the device holder or the integration unit further comprise a recess which at least partially engages the attachment device.

28. The arrangement as claimed in claim 20, wherein the device holder or the integration unit further comprises a projection which engages a depression present in the attachment device.

29. The arrangement as claimed in claim 20, wherein the attachment device completely covers the device holder and/or the integration unit when assembled.

30. The arrangement as claimed in claim 20, wherein the device holder or the integration unit further comprise a mobile telephone circuit on the electronic circuit board for a hands-free device.

31. The arrangement as claimed in claim 20, wherein the device holder or the integration unit further comprise apparatus and/or software for matching the level of the speech signals.

32. The arrangement as claimed in claim 20, wherein the device holder or the integration unit further comprises an interface for the attachment device and wherein the attachment device further comprises an apparatus and/or software which operates as a protocol module for the network of the vehicle, and for the communication device, and as an initialization routine for matching to the databus of the mobile telephone.

33. The apparatus as claimed in claim 20, further comprises a detachable latching connection which connects the device holder and/or the integration unit and the attachment device to one another when they are coupled.

34. The arrangement as claimed in claim 20, wherein the device holder or integration unit which is connected between the attachment device and the communication device further comprises a replaceable memory medium which stores user-specific functions which include one or more of the following, a hands-free facility, a connection for the vehicle bus, noise cancellation, echo cancellation, speech recognition, text conversion to speech and speech conversion to text.

35. The arrangement as claimed in claim 34, wherein the memory medium provides user-specific functions, which are available in the communication device including one or more of the following speech recognition, noise cancellation and echo cancellation.

36. The arrangement as claimed in claim 34, wherein the memory medium is in the form of a removable and/or rewritable memory medium including a memory board and plug-in module.

37. The arrangement as claimed in claim 34, wherein the memory medium is rewritable via a radio link.

38. The arrangement as claimed in claim 34, wherein the memory medium holds supplementary data for user-specific functions of the communication device, the device holder and the integration unit.

39. The arrangement as claimed in claim 38, wherein the user-specific functions includes an extended dictionary for text conversion to speech and/or speech conversion to text.

40. The arrangement as claimed in claim 20, wherein the attachment device has lines for one or more of the following a loudspeaker, a microphone, an antenna, a power supply, an ignition contact, a mute circuit for the audio system, data interchange for interchanging data between said communication device and a bus system which is part of the vehicle.

41. The arrangement as claimed in claim 20, wherein the device holder and/or the integration unit and the attachment device jointly form a connected unit whose dimensions are essentially the same as the dimensions of the device holder and/or of the integration unit.

42. The arrangement as claimed in claim 20, wherein the attachment device includes an attachment housing or a lower part which has a U-shaped cross section and side walls for mechanical connection to the device holder or the integration unit.

43. The arrangement as claimed in claim 20, wherein the attachment device and the device holder and/or the integration unit are mechanically and/or electrically connected by their respective longitudinal movement.

44. The arrangement as claimed in claim 22, wherein the plug elements are D-sub plugs.

45. The arrangement as claimed in claim 20, wherein the electronic circuit in either the device holder or the integration unit further comprises a plug element which connects with an associated plug element on the attachment device.

46. The arrangement as claimed in claim 45, wherein the device holder and the attachment device further comprise mechanical coupling elements, which couple to bind both together and additionally, the attachment device contains a recess wherein its mechanical coupling elements are placed and wherein the device holder, the electrical plug element of the device holder and/or integration unit are arranged in the recess and engage over the electrical plug element so that the mechanical coupling elements of the attachment device and the device holder couple.

47. The arrangement as claimed in claim 46, wherein the electrical plug elements are recessed in the operating direction with respect to the mechanical coupling elements.

48. The arrangement as claimed in claim 46, wherein the mechanical coupling elements moved with respect to one another essentially at right angles to an opening direction of the recess.

49. The arrangement as claimed in claim 46, wherein the device holder or the integration unit is connected to the attachment device by placing the device holder or the integration unit on the attachment device in the opposite direction to the opening direction of the recess, and by subsequently moving the device holder or the integration unit at right angles to the direction in which it was fitted.

50. The arrangement as claimed in claim 46, wherein the recess is arranged on a lower face of the device holder or the integration unit, with the lower face being opposite an accommodation area for the communication device.

51. The arrangement as claimed in claim 46, wherein the recess opens toward the lower face and toward a side surface of the device holder or of the integration unit.

52. The arrangement as claimed in claim 46, wherein the recess can be closed in particular by a slide and/or a flap and/or a cover.

53. The arrangement as claimed in claim 45, wherein the attachment device includes two or more parts, with at least two parts forming a cage for holding or fixing the electrical plug element, and with a further part for connection of the cage to the vehicle.

54. The arrangement as claimed in claim 20, wherein the device holder and/or the integration unit and/or the attachment device have indicating means including a display, a light-emitting diode or an optical conductor which provide information about operating states of the mobile telephone and/or of the device holder and/or of the integration unit.

55. The arrangement as claimed in claim 54, wherein the indicating means of the attachment device are arranged at the side, in an area which is visible despite the device holder and/or the integration unit being fitted.

56. The arrangement as claimed in claim 54, wherein the indicating means describe different events including an incoming call or received message, by blinking and/or illuminating at a different frequency and/or with a different intensity and/or color and/or sequence.

57. The arrangement as claimed in claim 54, wherein the indicating means are arranged in the form of a crown or ring on the attachment device.

58. The arrangement as claimed in claim 20, wherein the device holder and/or the integration unit and/or the attachment device have/has push button switches and/or sensors which initiate special facilities including emergency call, breakdown call or vehicle locking.

59. An apparatus for hands-free operation of an electronic device in a vehicle, comprising:
   a device holder for mechanically holding and communicating with the electronic device, said device holder comprising a front face and an opposed rear face, said front face being geometrically and mechanically matched to the electronic device;
   at least one electronic circuit board located within said device holder, said circuit board comprising all of the electronic components that are required for operation and control of the electronic device; and
   an attachment device for mounting said device holder to the vehicle, said attachment device being geometrically and mechanically matched to said device holder, and providing an electrical interface and a mechanical interface that are universally compatible with a variety of device holders, each of which is geometrically and mechanically matched to a variety of specific electronic devices, respectively, wherein said attachment device is free of any circuit boards.

60. The apparatus of claim 59, wherein said attachment device mounts to said rear face of said device holder.

61. The apparatus of claim 59, further comprising a latching mechanism which requires motion in more than one dimension to mount said device holder to said attachment device.

62. The apparatus of claim 61, wherein the first motion of said latching mechanism is inserting said attachment device into an opening on said rear face of said device holder when mounting said device holder to said attachment device.

63. The apparatus of claim 62, wherein the second motion of said latching mechanism is a sliding motion in a plane substantially parallel to a main plane of said device holder to engage said electrical interface and said mechanical interface between said device holder and said attachment device when mounting said device holder to said attachment device.

64. The apparatus of claim 59, wherein said attachment device comprises a plug element, a rest body, a flange and a baseplate.

65. The apparatus of claim 64, wherein said baseplate allows said attachment device to rotate in a plane on said baseplate when said device holder is mounted.

66. The apparatus of claim 64, wherein said attachment device further comprises a latching mechanism.

67. The apparatus of claim 66, wherein said latching mechanism is a latching pin.

68. The apparatus of claim 67, wherein said device holder comprises a control on said front face thereof that is depressed to release said latching pin.

69. The apparatus of claim 59, wherein said attachment device rotatably connects said electrical interface to said device holder.

* * * * *